United States Patent [19]
Hamada et al.

[11] Patent Number: 5,448,331
[45] Date of Patent: Sep. 5, 1995

[54] CAMERA UTILIZING ADDITIONAL ILLUMINATION FROM A FLASH LIGHT FOR FOCUS DETECTION AND EXPOSURE OPERATION

[75] Inventors: Masataka Hamada; Katsuyuki Nanba, both of Osakasayama; Hiroshi Ueda, Habikino; Reiji Seki, Osaka; Hidehiko Fujii; Jun Ishihara, both of Sakai; Kotomi Murakami, Nara, all of Japan

[73] Assignee: Minolta Camera Kabushiki Kaisha, Osaka, Japan

[21] Appl. No.: 176,291

[22] Filed: Dec. 30, 1993

Related U.S. Application Data

[63] Continuation of Ser. No. 921,698, Jul. 30, 1992, abandoned.

[30] Foreign Application Priority Data

| Aug. 1, 1991 | [JP] | Japan | 3-216429 |
| Aug. 1, 1991 | [JP] | Japan | 3-216430 |
| Apr. 10, 1992 | [JP] | Japan | 4-118263 |

[51] Int. Cl.⁶ .................. G03B 13/36; G03B 15/05
[52] U.S. Cl. .................. 354/403; 354/419; 354/132; 354/149.11; 354/238.1
[58] Field of Search .......... 354/419, 132, 127.1, 354/145.1, 149.11, 237, 238.1, 403, 415

[56] References Cited

U.S. PATENT DOCUMENTS

| 3,547,017 | 12/1970 | Harvey | 354/403 |
| 3,813,679 | 5/1974 | Hasegawa et al. | 354/403 |
| 4,839,686 | 6/1989 | Hosomizu et al. | 354/416 |
| 5,065,177 | 12/1991 | Yamamoto et al. | 354/403 |
| 5,122,829 | 6/1962 | Takami | 354/419 |
| 5,134,433 | 7/1992 | Takami et al. | 354/419 |

FOREIGN PATENT DOCUMENTS

| 1-293331 | 11/1989 | Japan . |
| 2237119 | 4/1991 | United Kingdom . |

*Primary Examiner*—W. B. Perkey
*Attorney, Agent, or Firm*—Burns, Doane, Swecker & Mathis

[57] ABSTRACT

Camera comprises a focus detecting section for performing an object distance measurement, a flash for illuminating the object and controller for control the camera. The flash is activated to emit auxiliary light so as to assist a focus detection when a focus detection is performed by the focus detecting section, and is activated to emit light for illuminating the object during an exposure of photographing. Also, camera is capable of a self-timer photographing, and indicates the self-timer photographing by emitting the flash light during the self-timer operation. The flash light is used both as the auxiliary light for a focus detection and light for indication of the self-timer operation.

19 Claims, 24 Drawing Sheets

CAMERA UTILIZING ADDITIONAL ILLUMINATION FROM A FLASH LIGHT FOR FOCUS DETECTION AND EXPOSURE OPERATION

This application is a continuation of application Ser. No. 07/921,698, filed Jul. 30, 1992, now abandoned.

BACKGROUND OF THE INVENTION

1. Field of the invention

The present invention relates to a camera, particularly to the camera having a device for illuminating an object so as to assist a focus detecting operation, and to the camera having so-called self-timer function for setting up a time-lag so that an actual release operation starts after the elapse of a predetermined time.

2. Description of the Prior Art

In the conventional camera wherein a focus detection is carried out with use of a light from the object, it is characteristic that the accuracy of the focus detection is degraded when a contrast of the object or an object brightness is low. Widely known is a camera developed in order to solve this problem, wherein an auxiliary light source, consisting of LED and the like, provided on a camera body or on an external flash unit, is used to illuminate the object at the above-mentioned photographing condition, and the focus is detected with use of a reflected light of the projected light. An auxiliary light source for auto focus photographing such as this is provided other than a flash unit, in the camera therein a built-in flash is incorporated. In case the external flash is used, a flash light emission source and an AF auxiliary light source are provided independently each other within an identical flash device.

Further, an intermittent emission is essentially applicable to the projection of the above-mentioned AF auxiliary light. On the other hand, such a light emission is needless in the light emission for flash photographing. Accordingly, light source is provided independently for the two in the conventional camera, and there has been no conception that an identical light source is usable for the two.

However, in order to provide separately the light source for AF auxiliary light in the camera using the flash, the number of items has to be accordingly increased. Hence, it has been difficult to render the camera compact and inexpensive.

Meanwhile, a camera having a so-called self-timer function for setting up a time-lag so that an actual release operation starts after the elapse of a predetermined time is widely known. In this type of camera, a display part is provided solely for the self-timer to indicate to a photographer that the release operation is now being delayed. Also known is a camera wherein the above mentioned AF auxiliary light is emitted during the time-lag of the self-timer photographing from the light source provided on the camera body or the external flash.

If a display part is provided solely for the self-timer, or the light is emitted from the light source of the AF auxiliary light, in order to indicate to the photographer that the release operation is now being delayed, naturally more items become necessary. Therefore, it has been difficult to render the camera compact and inexpensive. Hence, it has been difficult to render the camera compact and inexpensive.

SUMMARY OF THE INVENTION

A first object of this invention is to provide a camera, inexpensive as well as compact, and having a function for illuminating an object so as to assist a focus detecting operation when a contrast of an object or an object brightness is low.

A second object of this invention is to provide a camera, inexpensive as well as compact, and capable of indicating to a photographer that release operation is now being delayed, at the time of self-timer photographing.

A third object of this invention is to provide a camera, inexpensive and compact, and having a function for illuminating an object so as to assist a focus detecting operation when a contrast of an object or an object brightness is low, and further capable of indicating to a photographer that release operation is now being delayed, at the time of self-timer photographing.

DESCRIPTION OF THE PREFERRED EMBODIMENT

Figure 1:
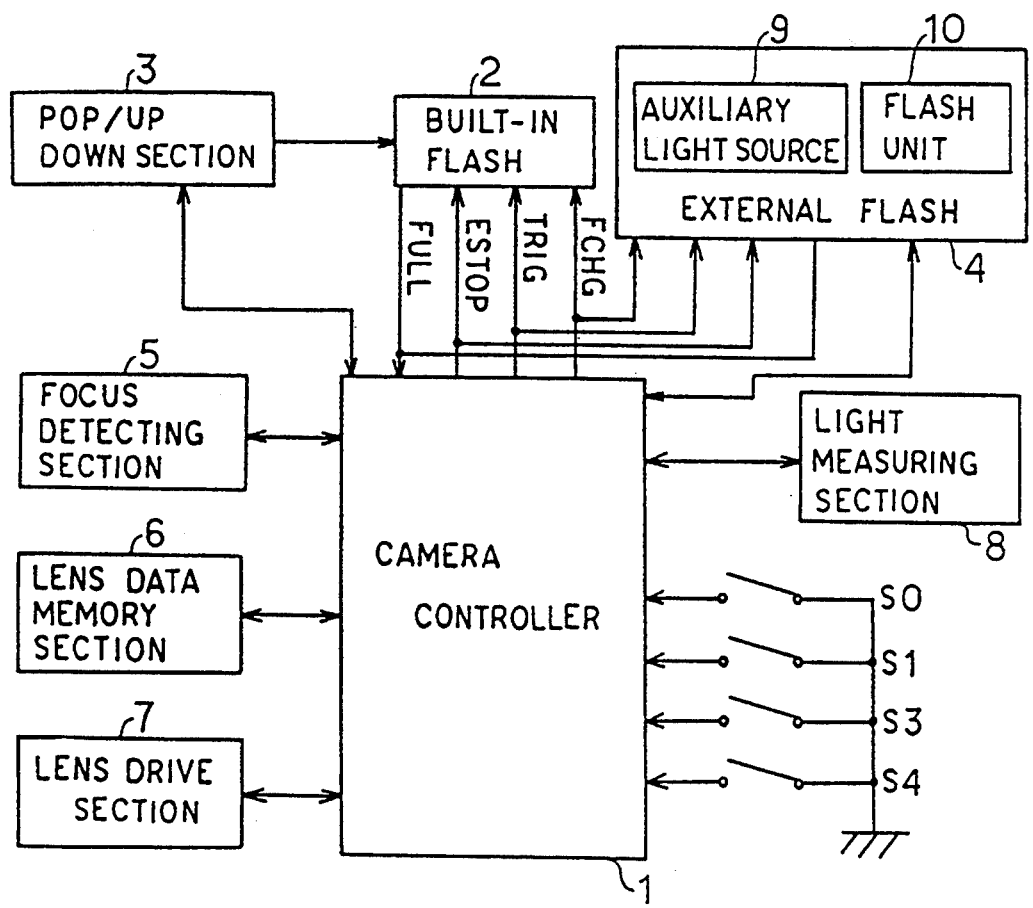
FIG. 1 is a block diagram showing a construction of an auto focus camera according to the first embodiment of the present invention.

Referring now to the drawings, an auto focus camera (referred to as a camera hereinafter) according to the first embodiment of the present invention is explained.

FIG. 1 shows a functional block construction of this camera. A camera controller 1, comprising micro computers and the like, to which below mentioned various kinds of external circuits are connected, controls the whole function of the camera including these circuits. Also, the camera embodies a built-in flash 2 as a flash device, and thereto an external flash 4 is attachable. The external flash 4 is composed of a flash unit 10 and an auxiliary light source 9 for auto focus (AF) consisting of LED and the like. The built-in flash 2 is driven either to the position which flash light can be emitted or the position which flash light can not be emitted, by means of a pop up/down section 3. Also, this built-in flash 2 is provided with IGBT (Insulated Gate Bipolar Transistor) in its control circuit, and is capable of continuous synchronous light emitting in short periodic cycle. The camera controller 1 outputs below-mentioned control signals to the built-in flash 2 or to the external flash 4 to activate thereof and receives the signals from these flashes. F CHG signal is to start charging, TRIG (trigger) signal is to start light emission, F STOP signal is to stop light emission and FULL signal indicates a charge completion. The built-in flash 2 is used also as a light source projecting an auxiliary light for AF when a focus detection is impossible because of low contrast or low brightness of an object.

A focus detecting section 5 performs an object distance measurement with use of an incident light through a photographing lens (not shown), in accordance with an instruction from the camera controller 1 and thereto outputs obtained data. A lens data memory section 6 memorizes a lens data of a photographing lens (not shown) and outputs said data to the camera controller 1. A lens driving section 7 performs a motor drive of a focusing lens based on a drive signal from the camera controller 1. A light measuring section 8 measures an object brightness and outputs obtained data to the camera controller 1.

A switch S0 is an eye approach detecting switch, which is turned on when a photographer looks into a finder and thereby the camera becomes operable. A switch S1 is a light and distance measuring switch which is turned ON by pressing halfway a release button (not shown). When the switch S1 is turned ON, the camera controller 1 obtains the data of the object brightness and the object distance respectively from the light measuring section 8 and the focus detecting section 5. A switch S2 is a release switch which is turned ON by pressing fully a release button whereby an exposure operation starts. A switch S3 is to inhibit an auxiliary light emission, and a mode to inhibit an auxiliary light for AF is selected when the switch S3 becomes ON, and a mode of automatic auxiliary light emission is selected by turning the switch S3 OFF.

Figure 2:
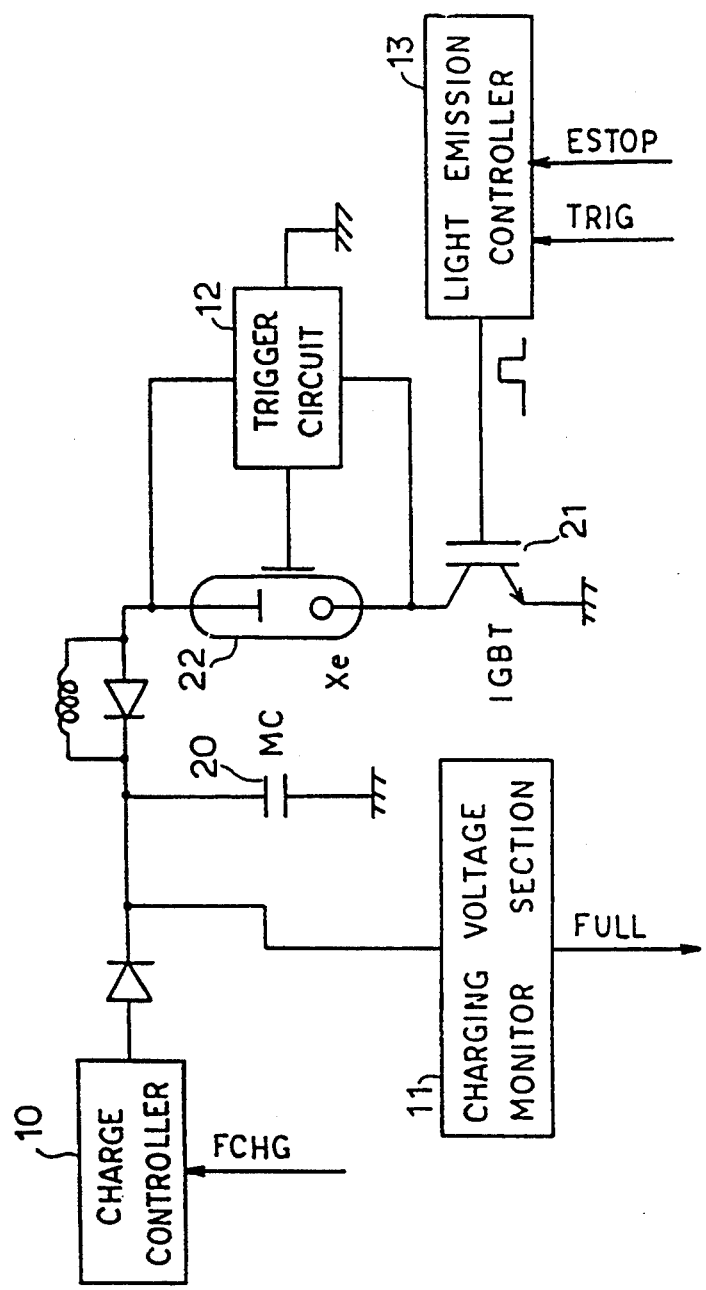
FIG. 2 is a circuit diagram of a built-in flash.
Figure 3:
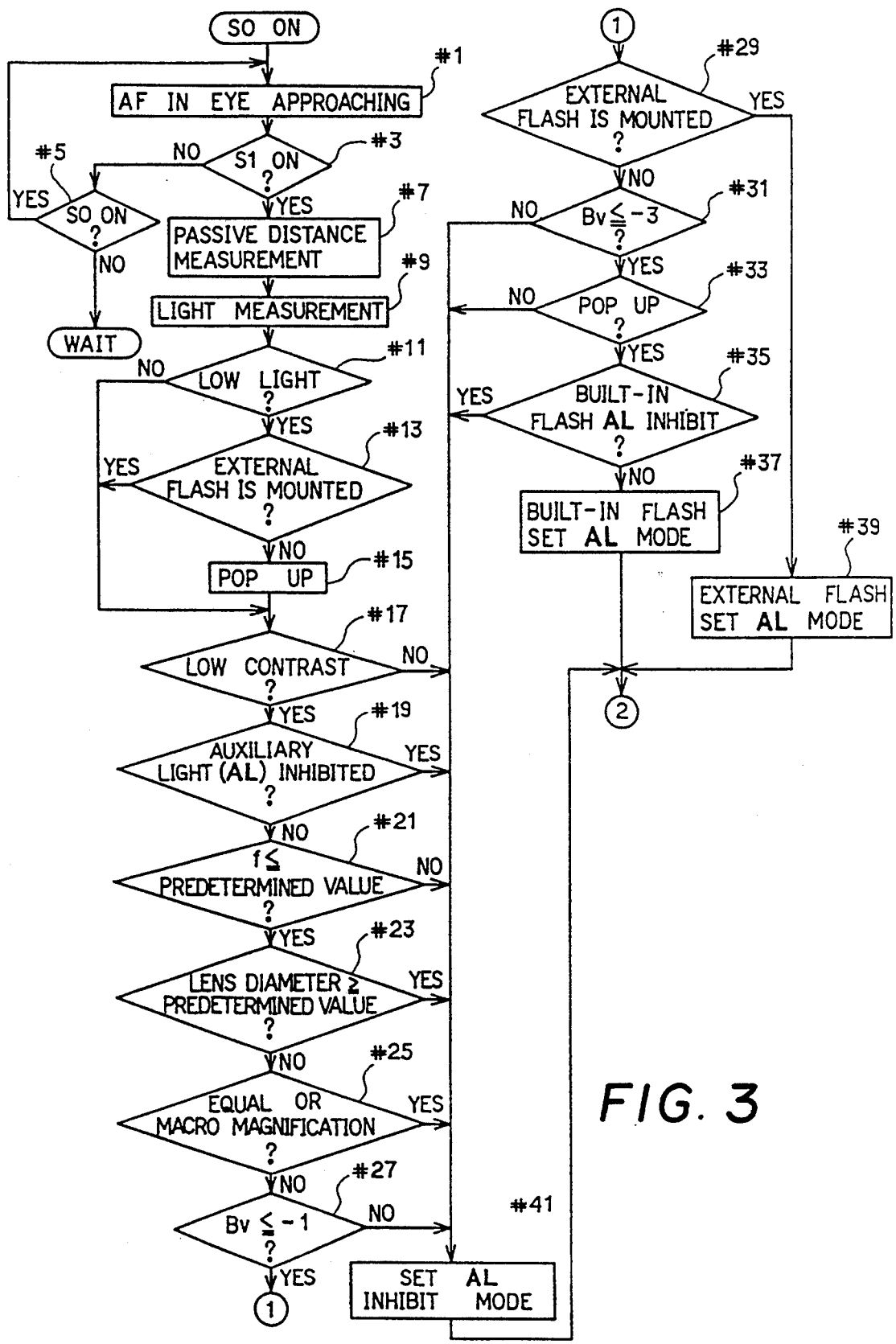
FIG. 3 is a flowchart showing an operation of the camera.
Figure 4:
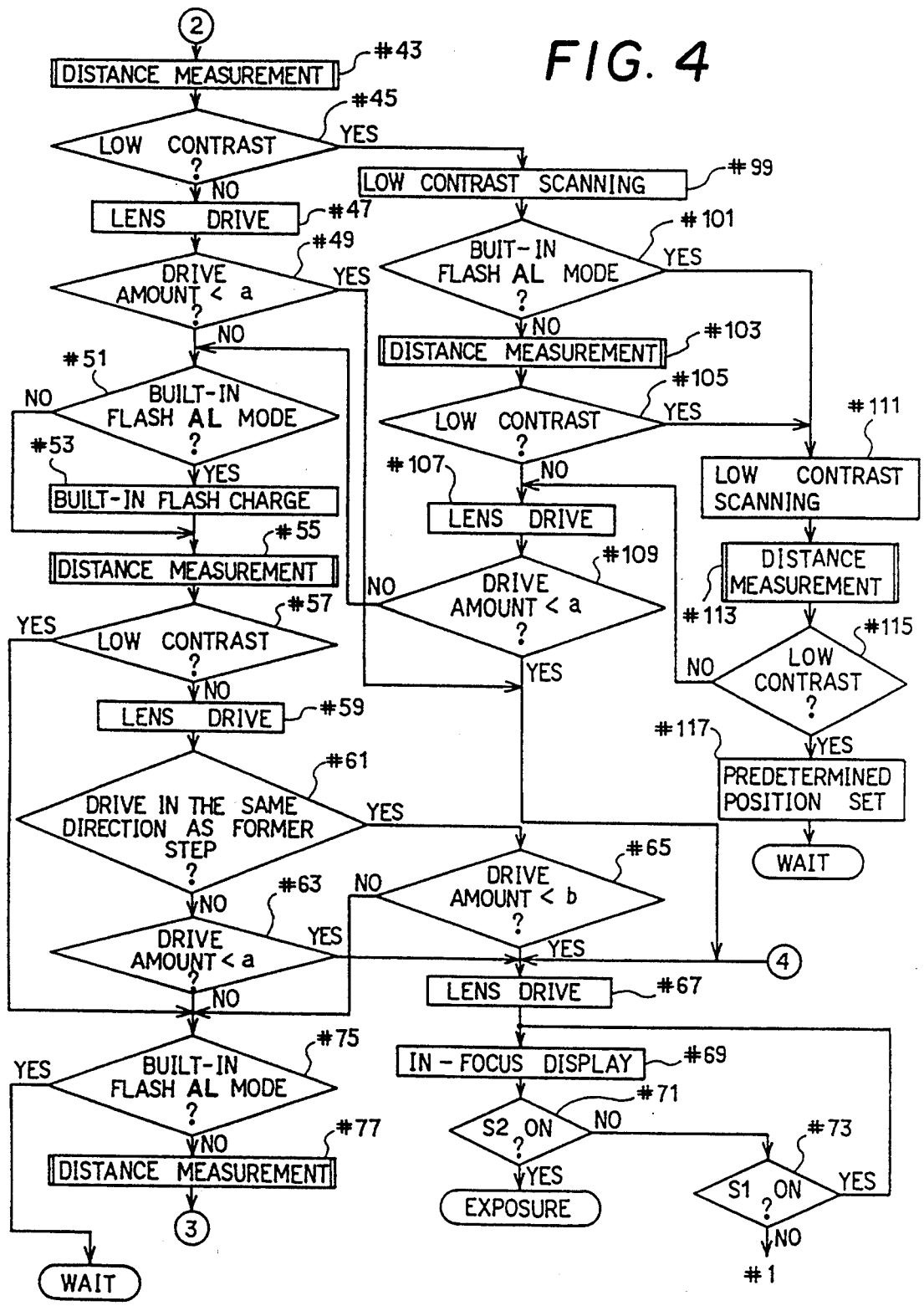
FIG. 4 is a flowchart thereof.
Figure 5:
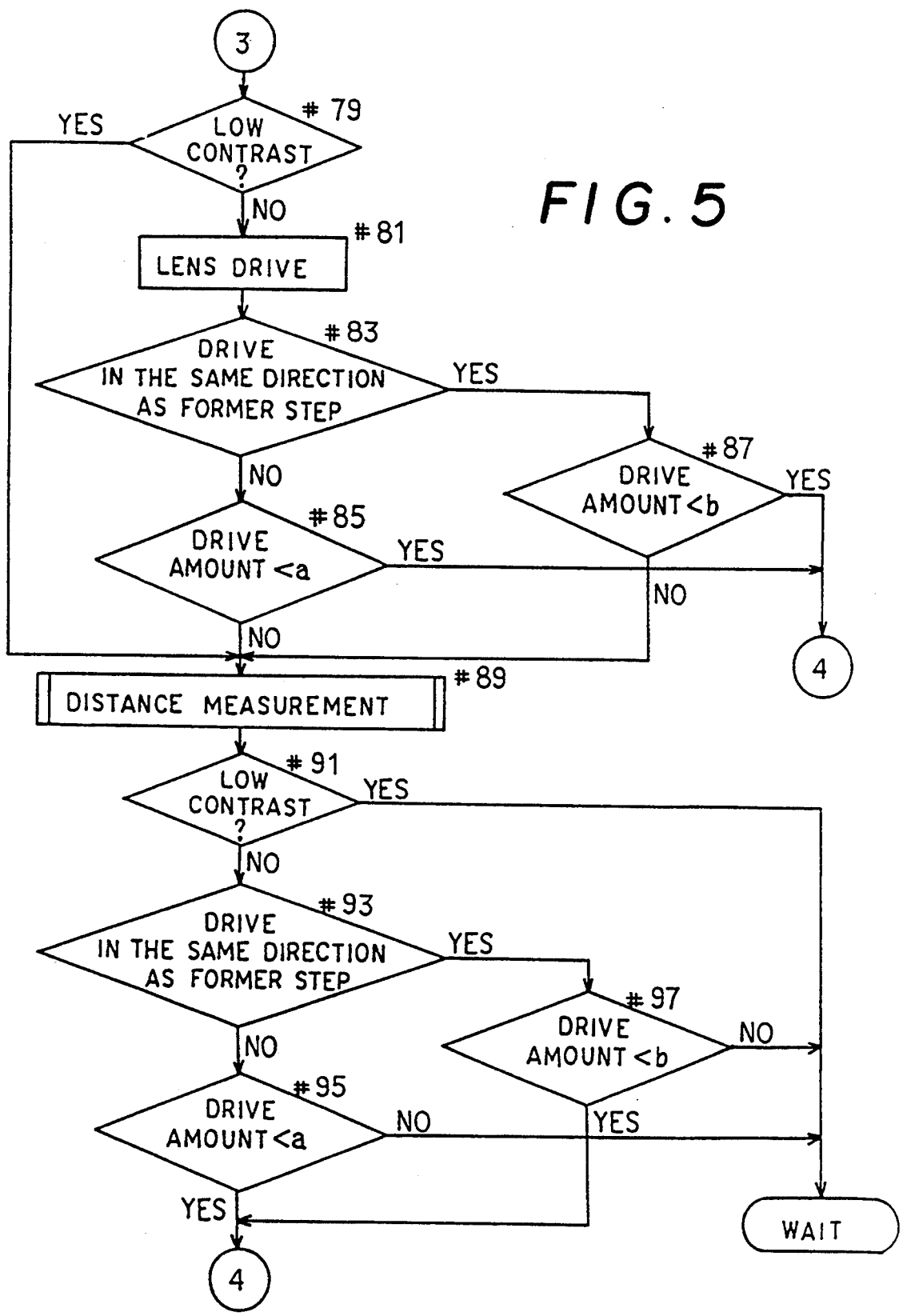
FIG. 5 is a flowchart thereof.

Nextly, the above mentioned control circuit of the built-in flash 2 is explained with reference to FIG.2. The built in flash 2 comprises a charge controller 10, a charging voltage monitor section 11, a trigger circuit 12, a light emission controller 13, a main capacitor 20, an IGBT 21 and a xenon tube 22. The charge controller 10 starts the charge of the main capacitor 20 when the charge starting signal F CHG is inputted from the camera controller 1. A light emission controller 13 turns the IGBT 21 ON when receiving the TRIG signal and turns the IGBT 21 OFF so as to stop the flash light emission when receiving the F stop signal. The charging voltage monitor section 11 outputs the FULL signal to the camera controller 1 when the charge is completed in the main capacitor 20. The trigger circuit 12 is a circuit for starting/stopping the light emission of the xenon tube 22 through ON/OFF of the IGBT 21.

Nextly explained are the operations of the camera according to the above-mentioned construction, with reference to flowcharts shown in FIGS. 3, 4, 5 and 6. Here is shown the operation after the switch S0 is turned ON. When the switch S0 is turned ON by detecting an eye approaching, continuous distance measurement (AF) in an eye approaching is performed (#1). Nextly whether the switch S1 is turned ON or not is judged (#3), and in case the switch S1 has not been turned ON, the switch S0 is checked (#5). And, when the switch S0 has been turned ON, the program flow returns to #1, while, when the switch S0 has not been turned ON, the program flow goes in stand-by situation, determining that the photographing operation is interrupted. When the switch S1 becomes ON at step #3, an object distance is measured in the manner of passive distance measurement (#7), and further a light measurement of an object brightness is carried out (#9). In accordance with the result of this measurement, whether it is low light or not is judged (#11), and in case of low light, whether the external flash 4 is mounted or not is checked (#13). In case it is not mounted, the built-in flash 2 is popped up (#15), and procedure advances to step #17. In case of no low light at #11 or the external flash 4 is mounted at #13 even if in case of low light, procedure directly advances to step #17.

At step #17, it is judged whether an object is low contrasted. In case of low contrast, it is discriminated whether an auxiliary light (AL) emission is inhibited (#19). When a mode to inhibit the auxiliary light emission is not set, it is then judged whether focal length f of now used lens is shorter than a predetermined value (for example, 300 mm) (#21), and in case of shorter length, it is then judged whether a lens diameter is longer than a predetermined value (#23). When the lens diameter is not longer, it is subsequently judged whether a macro photographing with greater than equal magnification is done (#25). In case it is not a macro photographing with greater than equal magnification, it is discriminated whether an object brightness value Bv (hereinafter will be called Bv in short) is lower than −1 (#27). In case of lower than −1 Bv, whether the external flash 4 is mounted is judged (#29).

Meanwhile, when it is judged the object is not low contrast at the above step #17 or when the auxiliary light emission is inhibited at step #19, the auxiliary light need not to be emitted. In case that the focal length f is longer than the predetermined value at #21, the object distance is generally so far that the auxiliary light does not reach even if projected. In case that the lens diameter is longer than the predetermined value at #23, the auxiliary light is eclipsed by the lens. In case of the macro photographing with greater than equal magnification at #25, the object distance is too short for the light to be projected upon the object. When it is determined that Bv is not lower than −1, as it is not low light, the auxiliary light is ineffective even if it is emitted. Accordingly, a mode to inhibit the auxiliary light emission is set up (#41). Also, when the external flash 4 is not mounted at the above #29, it is judged whether the object brightness value Bv is lower than −3 (#31). In case of lower than −3, it is checked whether the built-in flash 2 is popped up (#33). In case of pop up, it is checked whether the mode to inhibit the auxiliary light emission by the built-in flash 2 is selected or not (#35). If the mode to inhibit is not selected, a mode of the auxiliary light emission by the built-in flash 2 is set up (#37).

Meanwhile, when the external flash 4 is mounted at the above step #29, the mode of the auxiliary light emission by the external flash 4 is set up (#39). Also, when the external flash 4 is not mounted at #29 and Bv is not lower than −3 at #31, that is, when Bv is −3<Bv<−1, when the built-in flash 2 is not popped up at #33, or when the mode to inhibit the auxiliary light emission is selected at #35 (the switch S3 is turned ON), procedure goes to #41 and then the mode to inhibit the auxiliary light emission is set. In the above procedures from #27 to #31, if Bv is lower than −1, and the external flash 4 is mounted, the mode of the auxiliary light emission by the external flash 4 is promptly set at #39. Because it is possible to give a contrast between brightness and darkness by projecting a pattern light on the object with use of the auxiliary light emission of the external flash 4. Also, even when the external flash 4 is not mounted, if Bv is lower than −1 and not lower than −3, a distance measurement data is treated as a reliable one, thus it is supposed that the light emission of the built-in flash 2 as an auxiliary light for AF photographing is not needed.

After each of mode settings of #41, #37 and #39, procedures advance to #43 to carry out distance measurement. In the subroutine of distance measurement, the auxiliary light emission for AF photographing and the subsequent distance measurement are performed as described later. After this distance measurement, whether the object is low contrast or not is discriminated (#45). In case it is not low contrasted, a distance measurement value is treated as a reliable one, a lens drive is carried out based on the measured distance (#47), and it is discriminated whether a lens drive amount is smaller than the rest of lens drive amount a (a is a predetermined value, for example, 100 μm) to an in-focus point (#49). If the lens drive amount is smaller than a, it is treated as an approximate to the in-focus condition, then, the rest of lens drive to the in-focus point is carried out (#67), thereafter a display of in-focus is performed (#69). If the lens drive amount is not smaller than a, the setting condition of the mode of the auxiliary light emission by the built-in flash 2 is checked (#51). When the said mode is set, capacitor for the built-in flash 2 is charged (#53), and then a subroutine of a second distance measurement is carried out (#55). When the said mode is not set, the procedure advances to #55, skipping #53.

Having performed the subroutine of the distance measurement at #55, it is judged again whether the object is low contrast or not, and in case of not low contrast, the lens drive is performed based on the measured distance (#59). Nextly, it is judged whether a direction of the lens drive at #59 is the same as at #47 (#61). In case of the same direction as that of former step, which means that the lens drive is highly precise, it is judged whether the lens drive amount is smaller than a predetermined value which is larger than b, which is the rest of lens drive amount to the in-focus point (b is a predetermined value higher than a, such as 1000 μm) (#65). In case of value lower than b, it is treated as approximate to the in-focus, and the rest of lens drive to the in-focus point is carried out (#67) and thereafter the display of in-focus is performed (#69). In case that it is not the same direction as that of former step, it is judged whether the lens drive amount is smaller than a (#63). In case of smaller amount, procedure goes to #67 treating as approximate to the in-focus condition. While in case of not smaller amount, procedure proceeds through #75 to perform the distance measurement further. When the drive amount is not smaller than b, too, procedure proceeds to #75. In case of the low contrast at #57, procedure proceeds through #75 to perform the distance measurement further.

At #75, a setting condition of the mode of the auxiliary light emission by the built-in flash 2 is checked. When the mode is set, which means that the distance measurement has been already carried out by two times of auxiliary light emission with use of the built-in flash 2 at above #43 and #55, procedure enters in a stand-by situation, waiting for the switch S1 to be turned ON again. If the mode is not set at #75, a subroutine of a third distance measurement is carried out (#77).

Also, at above #45, it is determined that the object is still low contrast, the reliability of the measured value is low. Accordingly, a low contrast scanning wherein lens is driven simultaneously with a passive distance measurement is carried out (#99). Here, firstly a focusing lens is driven to the nearer side, and it is judged whether the mode of the auxiliary light emission by the built-in flash 2 is set (#101). If it is not set, the subroutine of distance measurement by the external flash 4 is performed (#103), and thereafter it is judged whether the object is low contrast or not (#105). If it is not low contrast, the lens is driven based on the measured distance (#107). Then it is judged whether the lens drive amount is smaller than a as in the foregoing (#109). In case of smaller amount, the lens drive is carried out (#67), and display of in-focus is performed (#69). In case the lens drive amount is not smaller than a, the procedure returns to #51 for performing the distance measurement further.

Also, when the mode of the auxiliary light emission by the built-in flash 2 is set at above #101, and when the determination of low contrast is made at above #105, the low contrast scanning is further carried out (#111). Here the focusing lens is driven to ∞ side and thereafter the subroutine of distance measurement is carried out (#113). Consequently it is judged whether the object is low contrast or not (#115) and the lens is set at a specified position for stand-by situation (#117), if it is still low contrasted. If it is not low contrasted at #115, the procedure advances to #107 and performs the lens drive.

After the execution of the subroutine of distance measurement at above #77, checking is made again whether or not the object is low contrasted (#79), and when it is no more low contrasted, the lens is driven based on the distance measurement value (#81). Then it is checked whether or not the direction of lens drive is the same as former step, as in the above (#83), and in case of the same direction, checking is made further whether the lens drive amount is smaller than b (#87). As a result, in case that it is smaller than b, procedure advances to #67. In case of not smaller than b, the subroutine of distance measurement is further executed (#89). While, if the direction of lens drive is not the same as former step at #83, it is checked whether the lens drive amount is smaller than a (#85). In case of smaller amount, procedure advances to #67, and in case of not smaller amount, the subroutine of distance measurement is executed (#89). When the object is low contrasted at #79, procedure directly advances to #89 to execute the subroutine of distance measurement.

After executing subroutine of the distance measurement at #89, checking is made again whether the object is low contrasted (#91). If it is still low contrasted, the procedure enters in the stand-by situation without carrying out further distance measurement. When it is not low contrasted, the direction of the lens drive is checked (#93), and thereafter when the direction of lens driven is same as former step and moreover the drive amount is smaller than b (#97), procedure advances to #67. In case of not smaller, procedure goes in the stand-by situation. In case of different direction at #93, it is judged whether the drive amount is smaller than a (#95). In case of smaller amount, procedure advances to #67. In case of not smaller amount, procedure goes in the stand-by situation.

After displaying in-focus at the above #69, it is judged whether the switch S2 is ON (#71). In case of ON, an exposure operation (photographing) is carried out. In case the switch S2 is not ON, it is judged further whether the switch S1 is turned ON (#73). When the switch S1 is turned ON, which indicates that the photographing operation is continued, procedure advances to #69 so as to perform an AF lock, continuing the display of in-focus. When the switch S1 is not turned ON, which indicates that the photographing operation is discontinued, procedure returns to #1.

Figure 6:
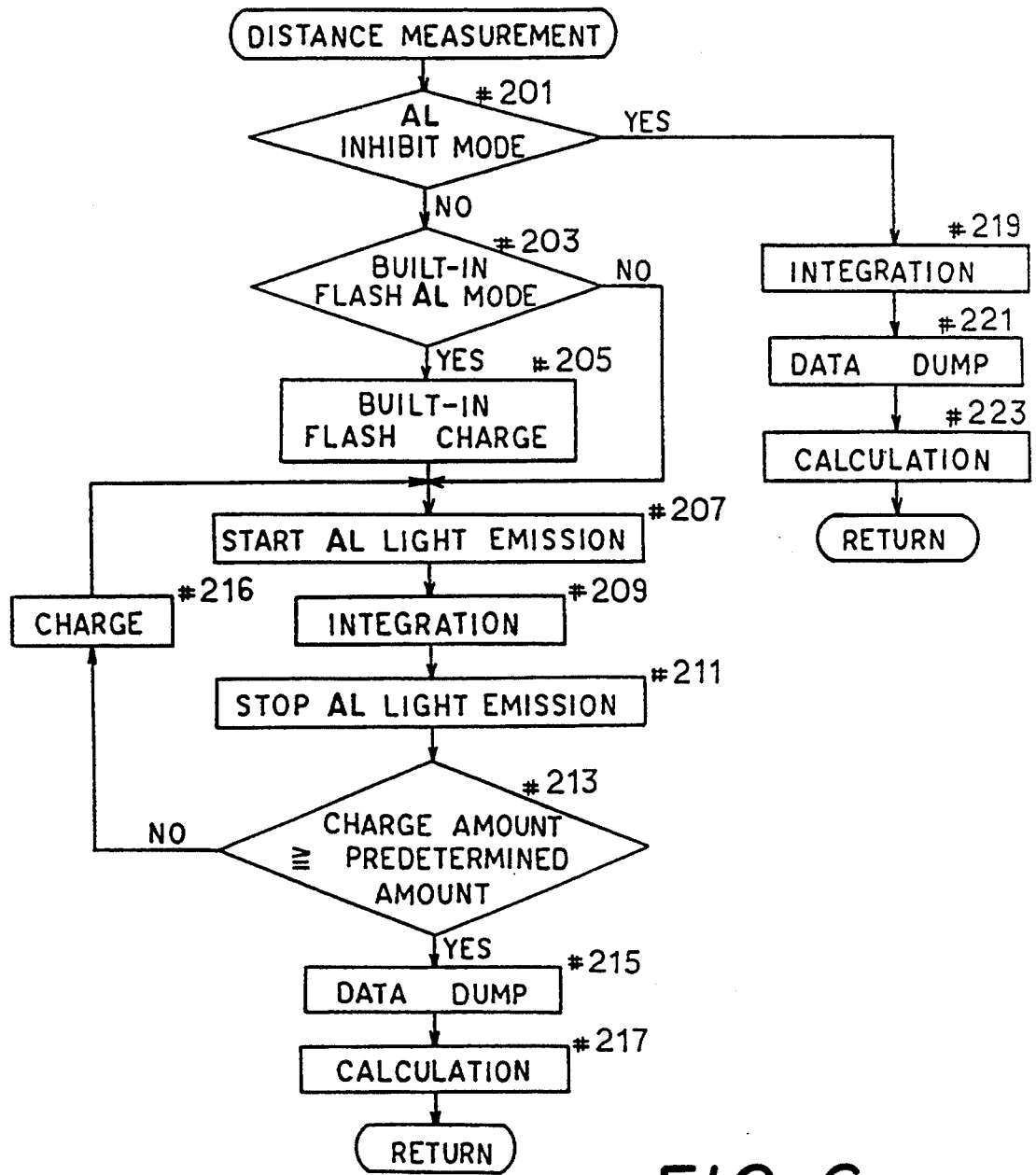
FIG. 6 is a flowchart showing a subroutine of a distance measurement operation.
Figure 7:
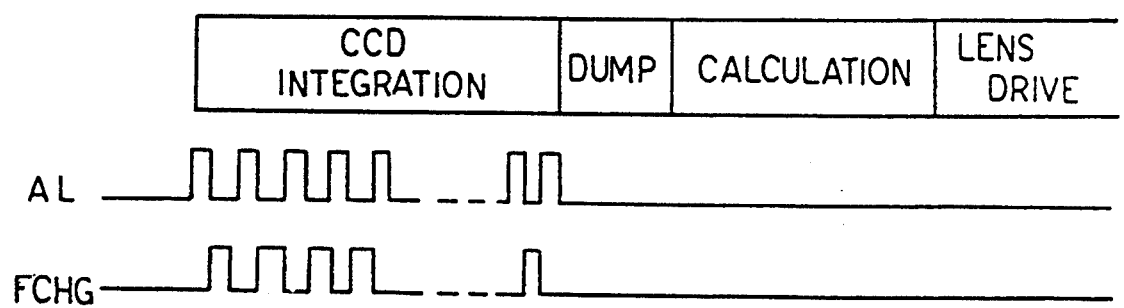
FIG. 7 is a time chart thereof.

Nextly the subroutine of above-mentioned distance measurement will be explained with reference to FIG.6. Timing chart of the distance measurement is shown in FIG.7. Upon entering in the distance measurement, firstly it is checked whether or not the mode to inhibit the auxiliary light emission is set (#121), and in case it is set, the integration of an accumulated charge of CCD stored in the focus detecting section 5 is performed (#139) based on the distance measurement value of the passive distance measurement, following which the dump of data (#141) and calculation (#143) are performed, and then procedure returns. In case the mode is not set, the setting condition of the mode of the auxiliary light emission by the built-in flash 2 is checked (#123). In case it is set, the built-in flash 2 is charged (#125), and the flash light emission is started (#127). While, when the mode of the auxiliary light emission by the built-in flash 2 is not set, assuming that the mode of the auxiliary light emission by the external flash 4 is set up, procedure advances to #127 skipping step #125, and the flash light emission by the external flash 4 is started.

Thereafter, the integration is performed based on the auxiliary light emission from either of these flashes (#129), and the auxiliary light emission is stopped (#131), and whether the charge amount exceeds or not a predetermined value is judged (#123). When it exceeds the predetermined value, the dump of data (#135) and calculation (#137) are performed, and then the procedure returns. When it does not exceed the predetermined value at #133, in order to perform further the auxiliary light emission, procedure returns to #127 after charging (#136), and then the same procedure is repeated until the charge amount exceeds the predetermined value.

As above mentioned, based on the data of the first passive distance measurement (#7), if it is once determined as low contrast (#17), and the mode of the auxiliary light emission by the built-in flash is set (#37), the distance measurement is carried out by means of the auxiliary light emission by the built-in flash in the subroutine of distance measurement at #43. If it is still low contrasted, the distance measurement is carried out by means of the second auxiliary light emission in the subroutine of distance measurement at #113, and in case that the low contrast continues even after performing the distance measurement by means of these auxiliary light emissions, procedure goes in the stand-by situation, waiting for the switch S1 to be turned ON again. While, the mode of the auxiliary light emission by the external flash is set up (#39), the distance measurement by means of the auxiliary light emission is possible not only at the above #43, #55, #113 but also at #103, #77 and #89 in the subroutine of distance measurement. Also, it is advantageous for a man to be photographed that the auxiliary light for auto focus photographing is not as dazzling as a temporary light emission in large amount, since it is emitted intermittently.

The present invention is not restricted to the above embodiment, but various kinds of modifications are possible. For example, the light emission of the external flash is controllable by IGBT, as in the built-in flash of this embodiment.

Figure 8:
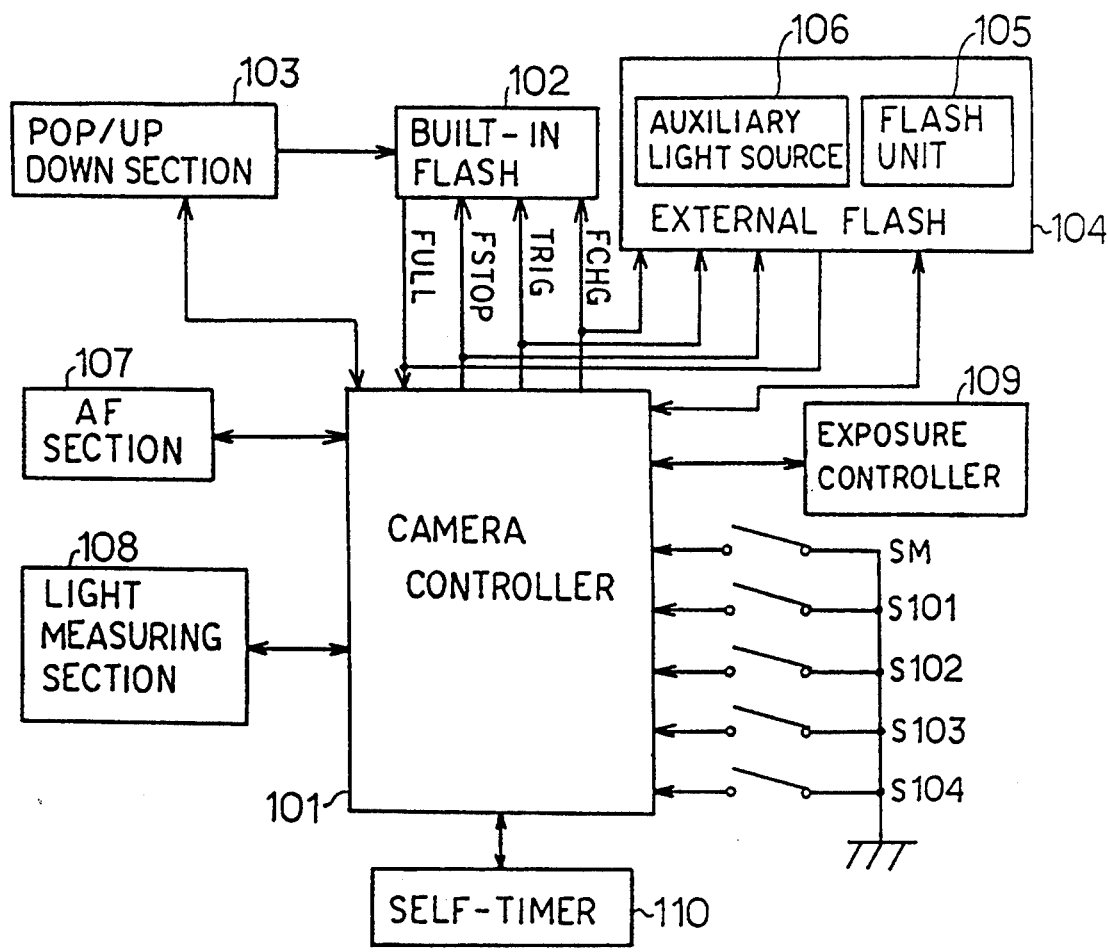
FIG. 8 is a block diagram showing a construction of a camera with self-timer function according to the second embodiment of the present invention.

Now explained is a camera provided with self photographing function according to the second embodiment of the present invention, referring to the drawings. FIG. 8 shows a functional block construction of the camera according to the second embodiment. Explained here is limited to the construction different from the first embodiment.

An AF section 107 performs an object distance measurement in accordance with instructions from a camera controller 101 and drives a lens to an in-focus position based on the result of the measurement. An exposure controller 109 performs exposure control in accordance with instructions from the camera controller 101. A self-timer 110 operates in a self photographing mode. In the self photographing mode, either the light emission by a built-in flash 102 or the auxiliary light emission by an external flash 104 indicates that the self-timer is operating.

A switch SM is a main switch, and the camera becomes operable when the switch SM is turned ON. A switch S103 is a self switch, and the self photographing mode is selected when it is turned ON. A switch S104 is a switch for selecting an automatic light emission mode in accordance with the flash light emission at the time of photographing, and the mode is set up by turning this switch S104 ON.

Figure 9:
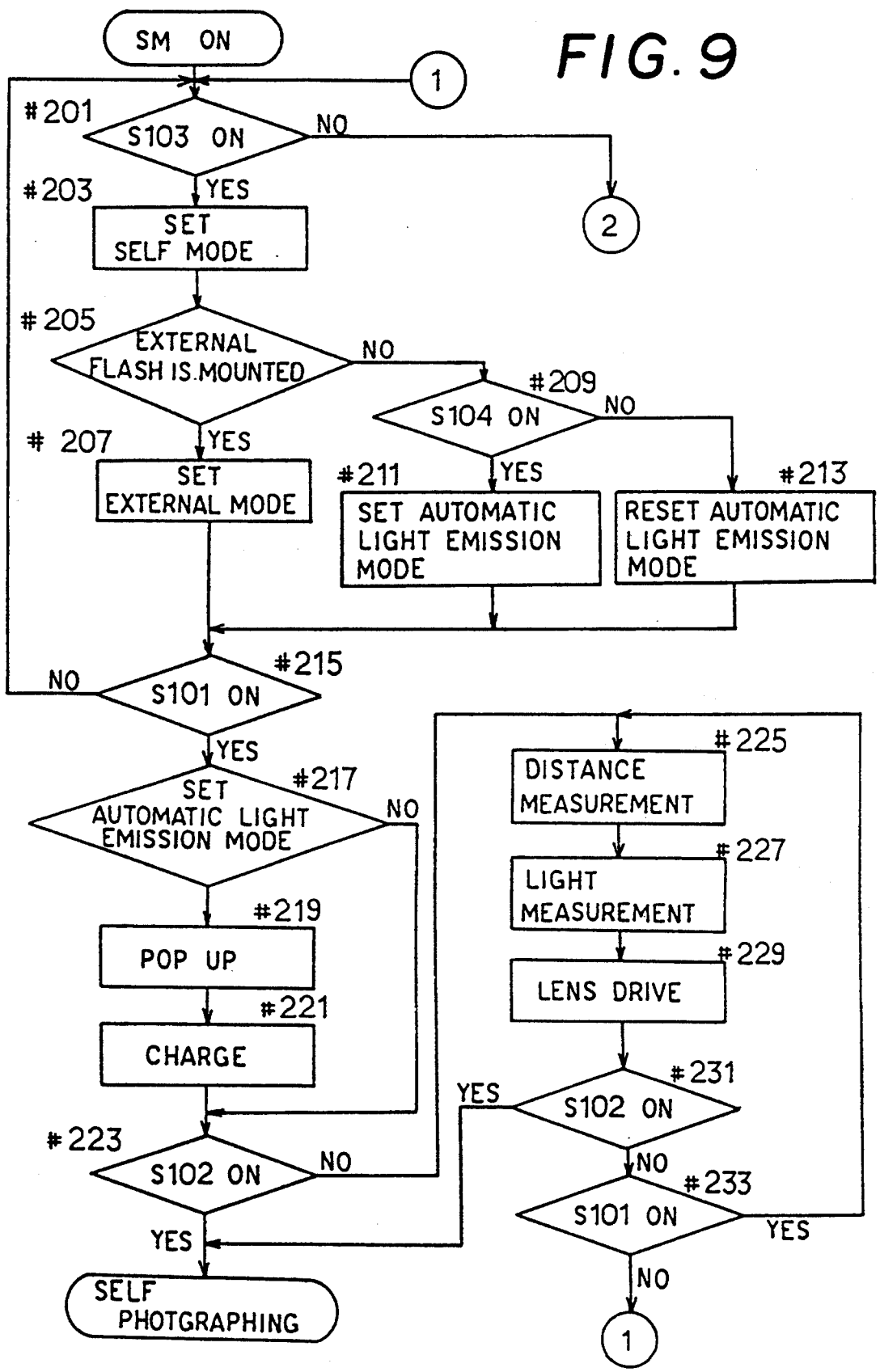
FIG. 9 is a flowchart showing an operation of the camera.
Figure 10:
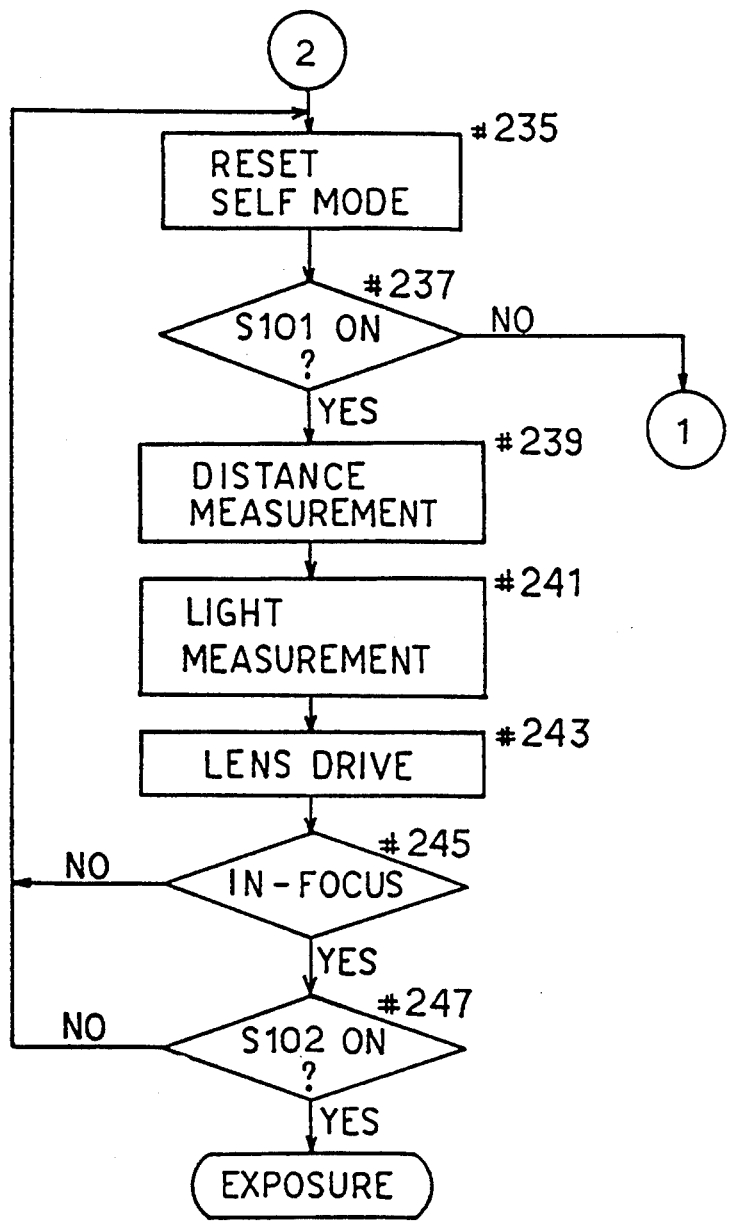
FIG. 10 is a flowchart thereof.
Figure 11:
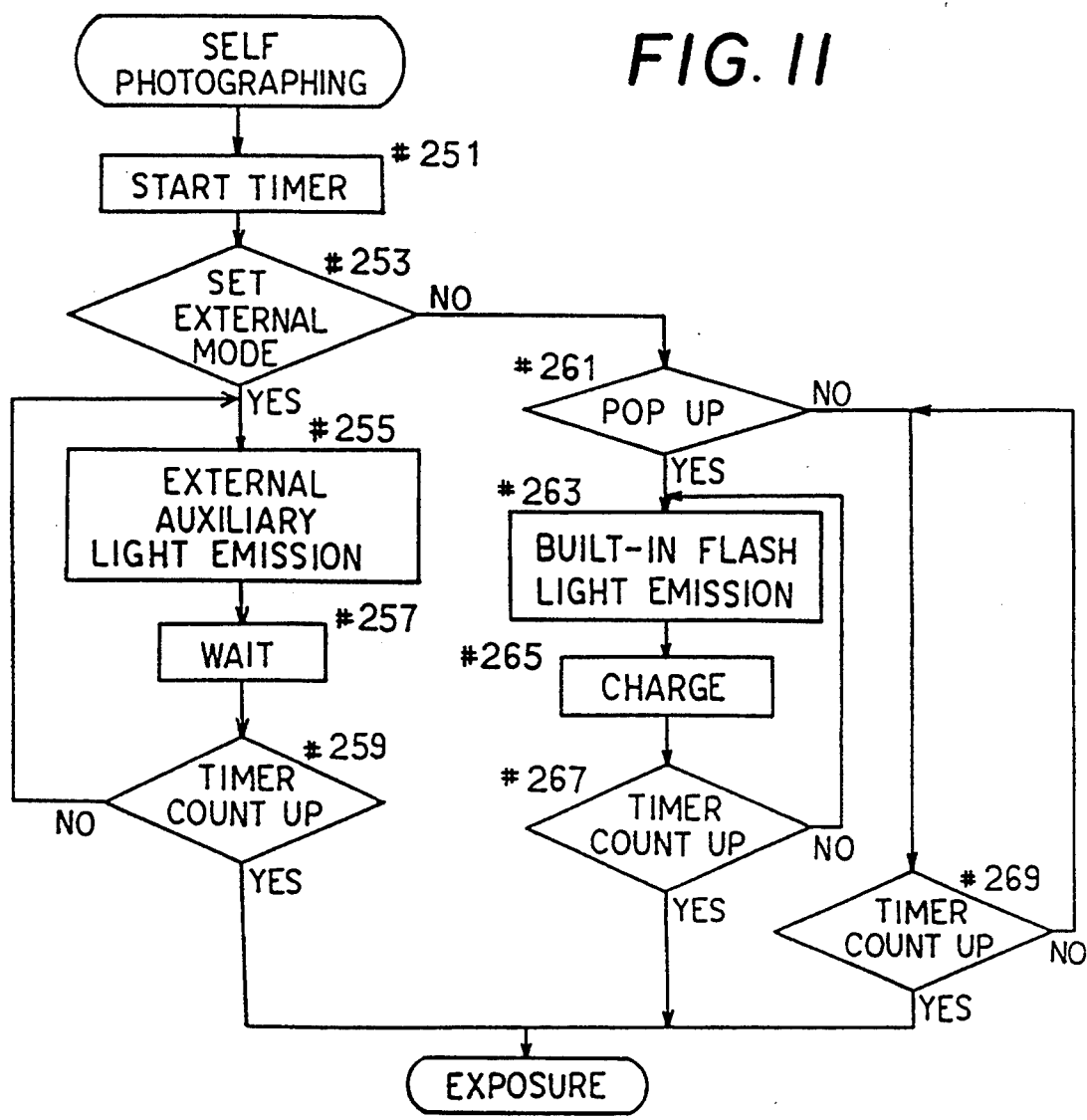
FIG. 11 is a flowchart showing a subroutine of a self photographing operation.

Nextly explained are the operations of the camera according to the above-mentioned construction, with reference to flowcharts shown in FIGS. 9, 10 and 11. Here is shown the operation after the main switch SM is turned ON. When the switch SM is turned ON, the camera becomes operable and thereafter it is checked whether the switch S103 is turned ON (#201). When it is turned ON, a self mode to carry out the self photographing is set up (#203), and then whether an external flash 104 is mounted or not is checked (#205). When it is mounted, an external mode is set up so as to indicate that the self-timer 110 is operating with use of an auxiliary light source 106 for auto focus which is provided in the external flash 4 (#207). When the external flash 104 is not mounted, the condition of a switch S104 for selecting the automatic light emission mode is checked (#209). In case the switch S104 is turned ON, the automatic light emission mode is set (#211), and in case it is not turned ON, the automatic light emission mode is reset (#213).

After setting each mode at the above steps #207, #211 and #213, whether the switch S101 is turned ON is checked (#215). In case it is not turned ON, procedure returns to #201. In case it is turned ON, whether the automatic light emission mode is set or not is checked (#217). When the mode is set up, the built-in flash 102 is popped up (#219), and is charged (#221), and thereafter whether the switch S102 is turned ON is checked (#223). When the automatic light emission mode is not set at #217, procedure directly advances to #223. In the judgment at #223, when the switch S102 is not turned ON, after performing the distance measurement (#225) and the subsequent light measurement (#227), a lens is driven (#229) and the condition of the switch S 102 is checked (#231). In case the switch is not turned ON, the condition of the switch S101 is checked (#233), and if the switch S101 is still turned ON, procedure returns to #225. If the switch S101 is not turned ON, procedure returns to #201, determining that the photographing operation is discontinued. If the switch S102 becomes ON at #223 and #231, the self photographing is started, of which subroutine will be described later.

In case the switch S103 is not turned ON at above #201, the self mode is reset (#235), supposing that the self photographing is not carried out, and the condition of the switch S101 is checked (#237). In case the switch s101 is turned ON, the distance measurement (#239) and the light measurement (#241) are performed. After lens driving (#243), whether focus is in or not is checked from the result of the distance measurement (#245). When the focus is in, the condition of the switch S102 is checked (#247), and if it is turned ON, exposure operation is carried out. In case that the focus is not in at #245 or that the switch S102 is not turned ON even if the focus is in, procedure returns to #237 to repeat foregoing procedure. If the switch S101 is not turned ON at #237, procedure returns to #201.

Nextly, the subroutine of above-stated self photographing is explained with reference to FIG. 11. On entering in the self photographing operation, the self-timer 110 starts (#251), and it is checked whether the external mode is set (#253). When the external mode is set, the light emission of the auxiliary light source 106 is started so as to thereby indicate that the self-timer 110 is operating (#255). After having waited for a predetermined time (#257), procedure goes around the loop of #255–#259 so as to carry out the light emission until the self-timer 110 counts up. When the external mode is not set at #253, whether the built-in flash 102 is popped up or not is checked (#261). In case it is popped up, the flash light of the built-in flash 102 is emitted so as to indicate that the self-timer 110 is operating (#263). After charging (#265), the light emission is repeated in the loop of #263–#267, until the self-timer 110 counts up. If the self-timer 110 counts up at #259 and #267, exposure operation is performed. While, in case the built-in flash 102 is not popped up at the above #261, waiting for the self-timer 110 to count up at #269, and then the exposure operation is performed.

The present invention is not restricted to the above-mentioned embodiment, but various kinds of modifications are possible. For example, the light emission of the built-in flash 102 or of the external flash 104, which is arranged in the above embodiment to start simultaneously with the starting of the self-timer 110, can be arranged to start a few seconds (for example, 2 seconds) before the exposure operation . Also, a self indication, which is carried out only in the automatic light emission mode, can be arranged to be carried out also in the compulsory light emission mode and in the non light emission mode. Further, a built-in flash, which is popped up only at the time of the automatic light emission, can be popped up also in other modes. The indication with use of built-in flash of the type in which flash is not popped up/down is possible, too.

Nextly, as a modification of the second embodiment, the embodiment wherein a built-in flash is popped up for self indication at the time of self photographing, also in the mode other than natural light emission mode.

Figure 12:
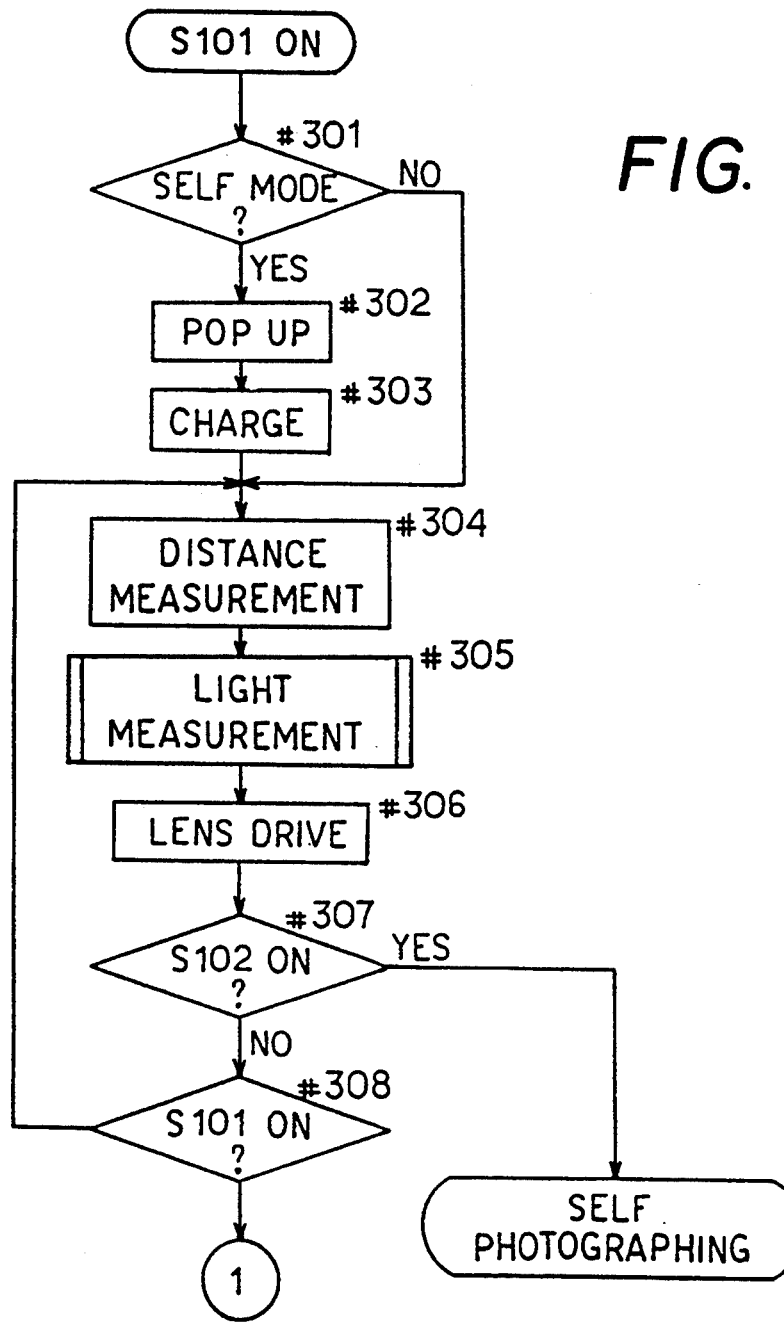
FIG. 12 is a flowchart showing an operation of a camera according to a variation of the second embodiment.
Figure 13:
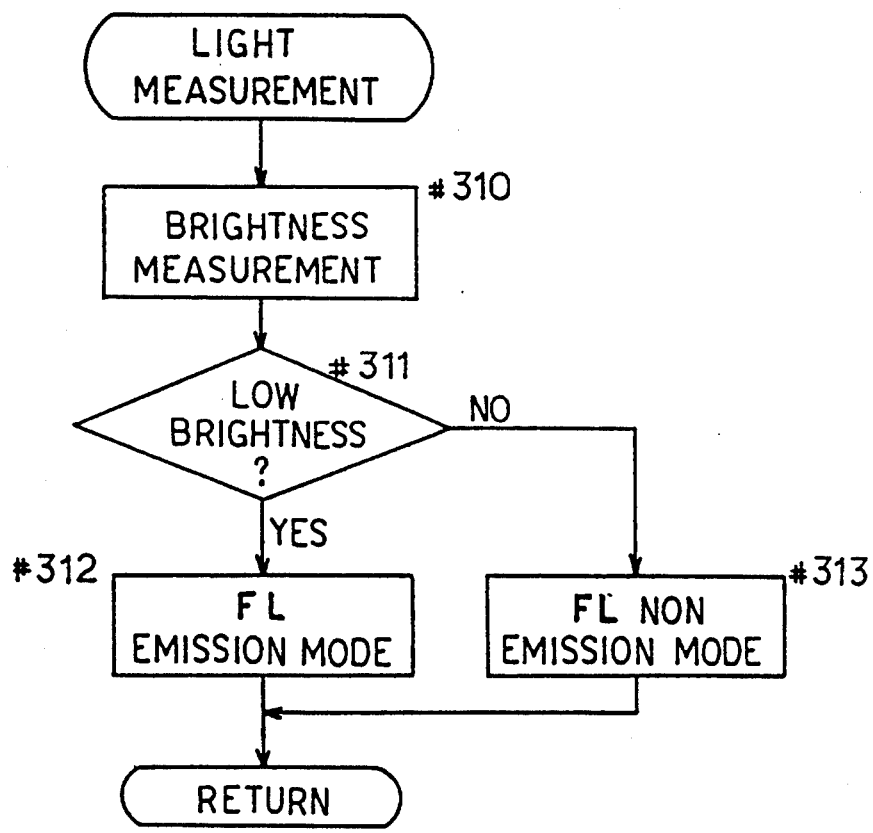
FIG. 13 is a flowchart thereof.

FIG. 12 is a flowchart showing the operation after the switch S101 is turned ON in FIG. 9. In the above-mentioned second embodiment, whether it is automatic light emission is checked after the switch S101 is turned ON, and the flash is popped up only in the automatic light emission mode. While, in the modified embodiment, it is checked whether self mode or not after the switch S101 is turned ON (#301). In case of the self mode, the flash is always popped up (#302). Following which, charging, distance measurement and light measurement are performed as in the second embodiment. In the light measurement, as shown in FIG. 13, an object brightness is measured (#310) and then whether it is low brightness or not is judged (#311). In case of low brightness, flash light emission mode is set, and in case of not low brightness, flash light non emission mode is set (#312, #313). After that, procedure is same as the second embodiment until the switch S102 is turned ON.

Figure 14:
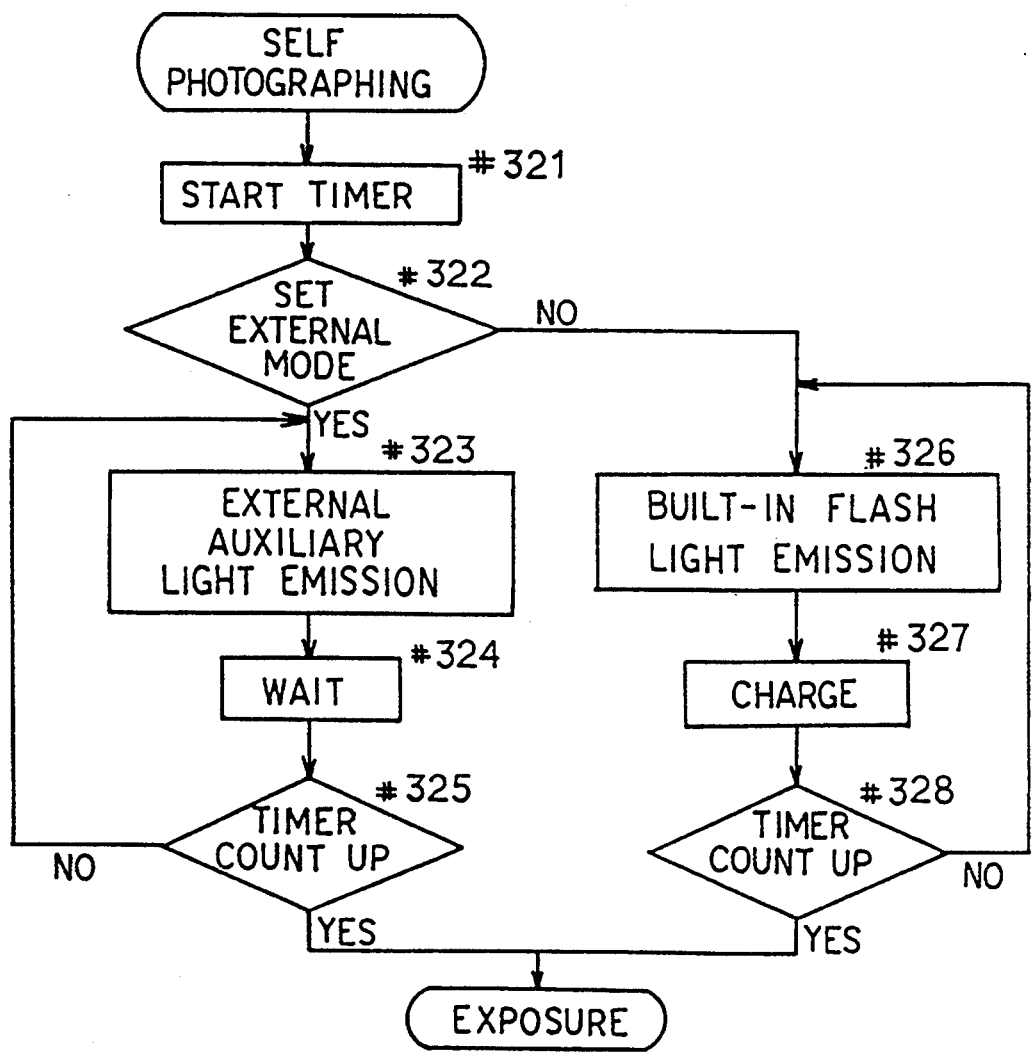
FIG. 14 is a flowchart showing a subroutine of a self photographing operation.

After the switch S102 is turned ON, self photographing operation is started as shown in FIG. 14. The self-timer starts at #321, and it is judged whether external mode for using an external flash or not at #322. In case of the external mode, self indication by means of an auxiliary light emission of the external flash is carried out (#323–#325), as in the second embodiment. In case it is not external mode, the self indication by means of the built-in flash is carried out always (#326–#328).

Figure 15:
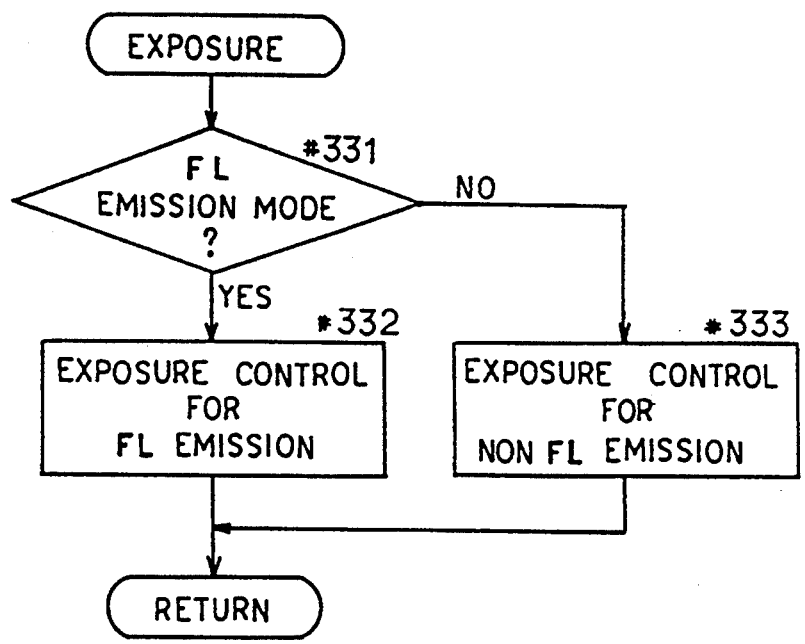
FIG. 15 is a flowchart showing an exposure operation of the camera.

After carrying out the self indication for a predetermined time, an exposure operation shown in FIG. 15 is started. This exposure control is carried out based on the light measurement shown in FIG. 13. If the flash light emission mode is set at the time of light measurement shown in FIG. 13, the exposure control by means of the flash light emission is carried out because it is low brightness (#332). Conversely, if the flash light non emission mode is set at #313, exposure control without flash light emission is carried out (#333). In other words, the built-in flash is popped up so as to perform the self indication by means of flash light emission, while the self timer is operating, however, light is not emitted at the time of actual exposure operation.

Figure 16A:
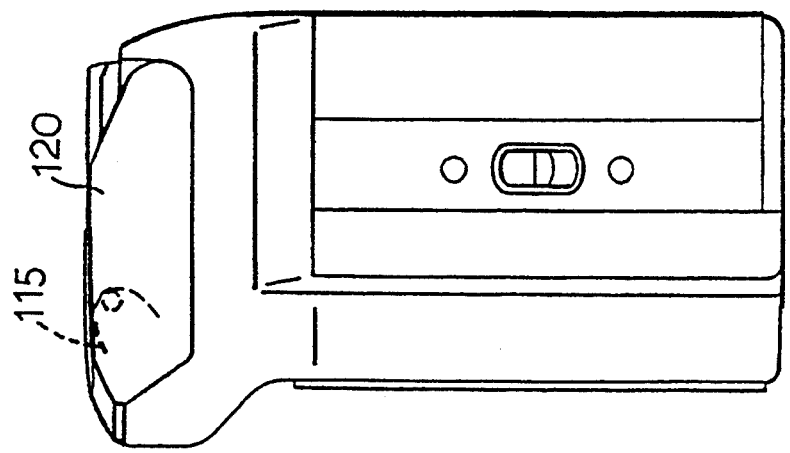
FIG. 16(a) is a side view of a camera with its flash retracted, according to the third embodiment of the present invention.
Figure 16B:
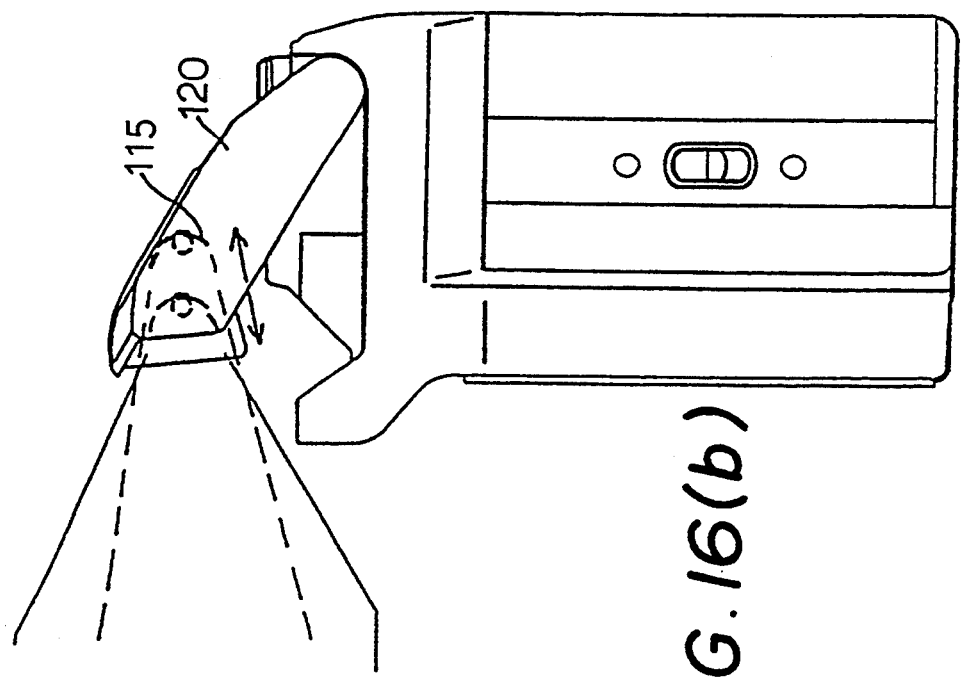
FIG. 16(b) is a side view of the camera with its flash used.

FIG. 16 shows a side view of a camera according to the third embodiment. FIG. 16 (a) shows a condition when a flash is retracted (a light emission case is moved down), FIG. 16 (b) showing a condition when a flash is used (the light emission case is moved up). As shown in FIG. 16 (b), a flash light distributing angle is changeable (zooming) when the flash is used, by moving horizontally a flash light reflector 115 incorporated in the light emission case 120. This construction permits to select the flash light distributing angle in accordance with photographing conditions such as a focal length of a photographing lens.

Figure 17:
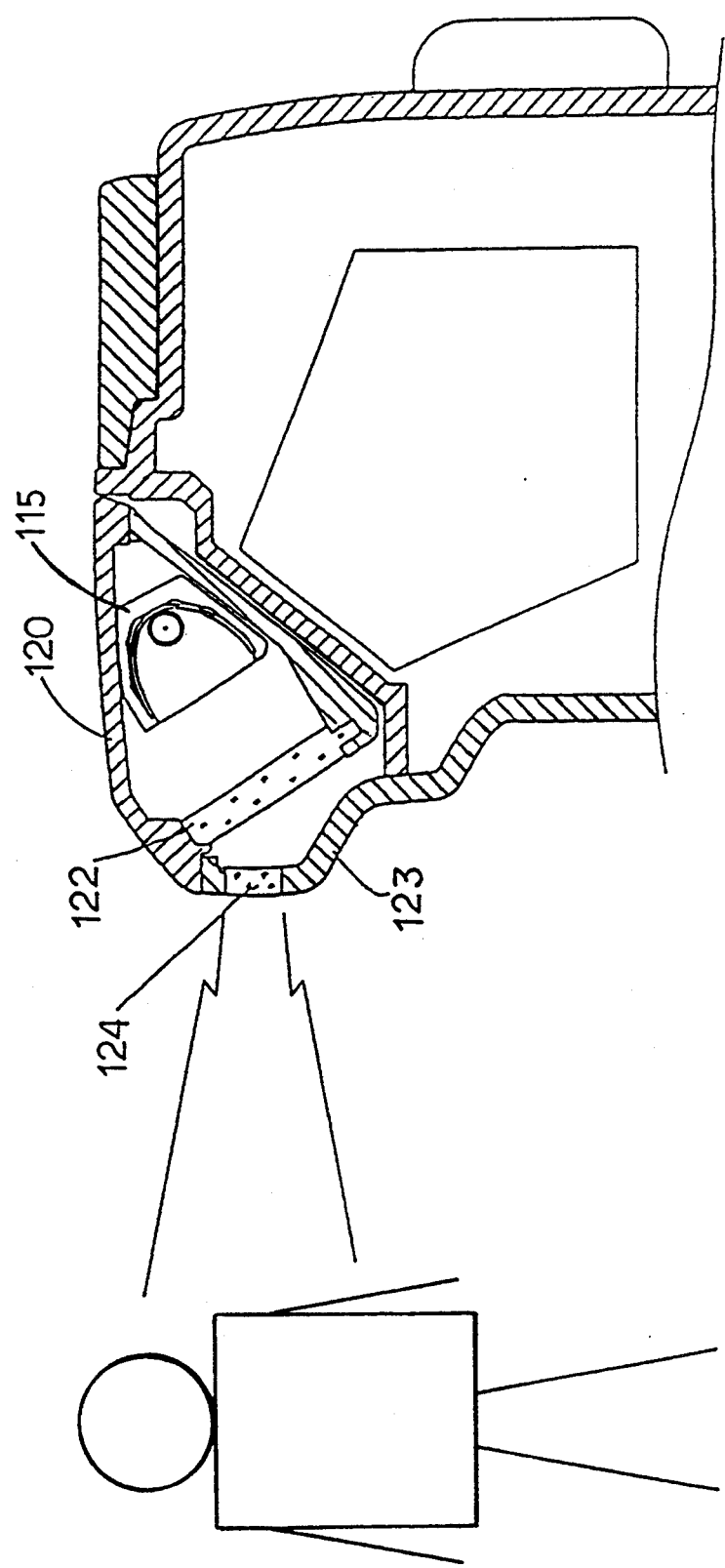
FIG. 17 is a sectional view showing a section of flash in retractive position.

In the present embodiment, it is arranged that a flash light is emitted in a popped down position at the time of self-timer photographing, for notifying a release timing to a photographer. The construction for this operation is shown in FIG. 17, which illustrates the condition wherein the light emission case 120 is moved down. A light emission panel 122 is disposed ahead of a light reflector 115, and an opaque material 124 in slit form is located at the point where a front cover 123 faces with the light emission panel 122. In this construction, with the light emission case 120 moved down, when the photographing is carried out by using the self-timer, it is possible to arrange that flash light is emitted intermittently for a short period in order to notify a release timing to the man to be photographed. Since the light emission for notifying a release timing is carried out in this manner, with flash light emitting section moved down, the man to be photographed can distinguish the light emission for notice from the light emission at the time of releasing.

Figure 18:
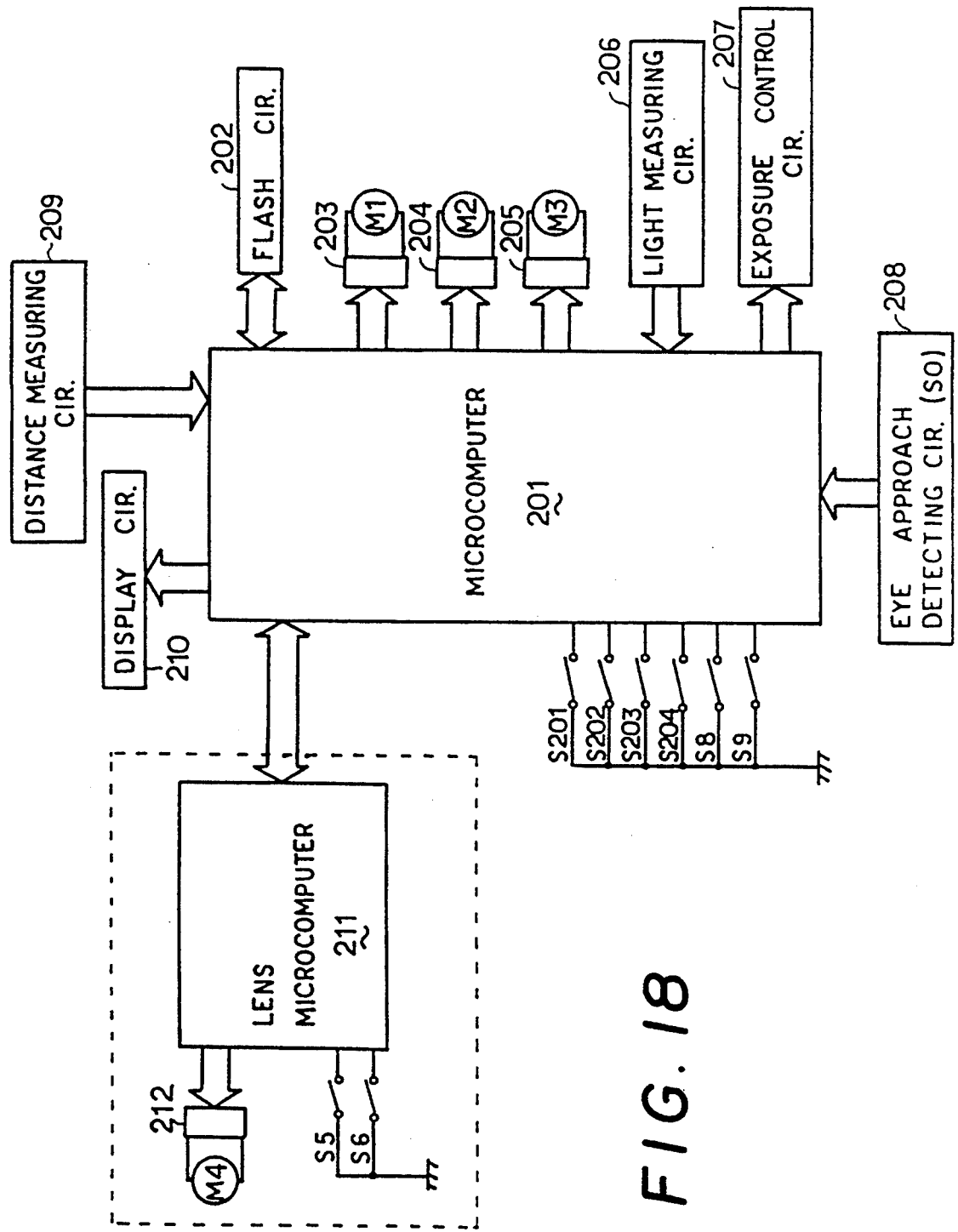
FIG. 18 is a block diagram showing an electric circuit of the camera.

FIG. 18 shows a block diagram of an electric circuit of the camera. The portion enclosed with a dotted line shows an electric circuit of a lens section. A microcomputer 201 which controls the whole system of the camera, performs the data communication with the following various kinds of circuits connected thereto through bath. A flash circuit 202 controls operation of the flash such as light emission and charging. A driving circuit 203 drives a flash motor M1, which is a driving source for the zooming operation of the distributing light angle and for the up/down operation of the light emission case. A driving circuit 204 drives a lens driving motor M2 for auto focus photographing. A driving circuit 205 drives a motor M3 for winding a film. A light measuring circuit 206 measures an object brightness, and the exposure control circuit 207 controls shutter, aperture and the like.

An eye approach detecting circuit 208 is a circuit for detecting that a photographer looks into a view finder. Here an eye approach detection is referred as a switch S0, referred to the operation of a switch. The switch S0 is ON when an eye is approaching the view finder, and OFF when an eye is not approaching. A distance measuring circuit 209 is a circuit to detect the distance between the camera and the object for an auto focus operation, and a display circuit 210 displays shutter speed, film counter and the like. A lens microcomputer 211 controls the zooming operation and the like, by communicating data such as focal length data and switch data with the control microcomputer 201. A driving circuit 212 connected to the lens microcomputer 211 drives a zoom motor M4 under the control of the lens microcomputer 211. Operating switches S5 and S6 for performing the zooming operation of the lens are also connected to the lens micro computer 211. When the switch S5 is turned ON, the lens is driven from telephoto to wide, and when the switch S6 is turned ON, the lens is driven conversely from wide to telephoto by the motor M4.

A switch S201 is turned ON by pressing halfway a release button of the camera. A switch S202 is turned ON by pressing fully the release button. A switch S203 is turned ON by being held a grip of the camera by a photographer. A switch S204, which is a switch to detect the up/down condition of the light emission case, is turned ON when the case is up, and OFF when down. A switch S8 is a flash mode selecting switch for selecting the mode for exposure operation.

Figure 19:
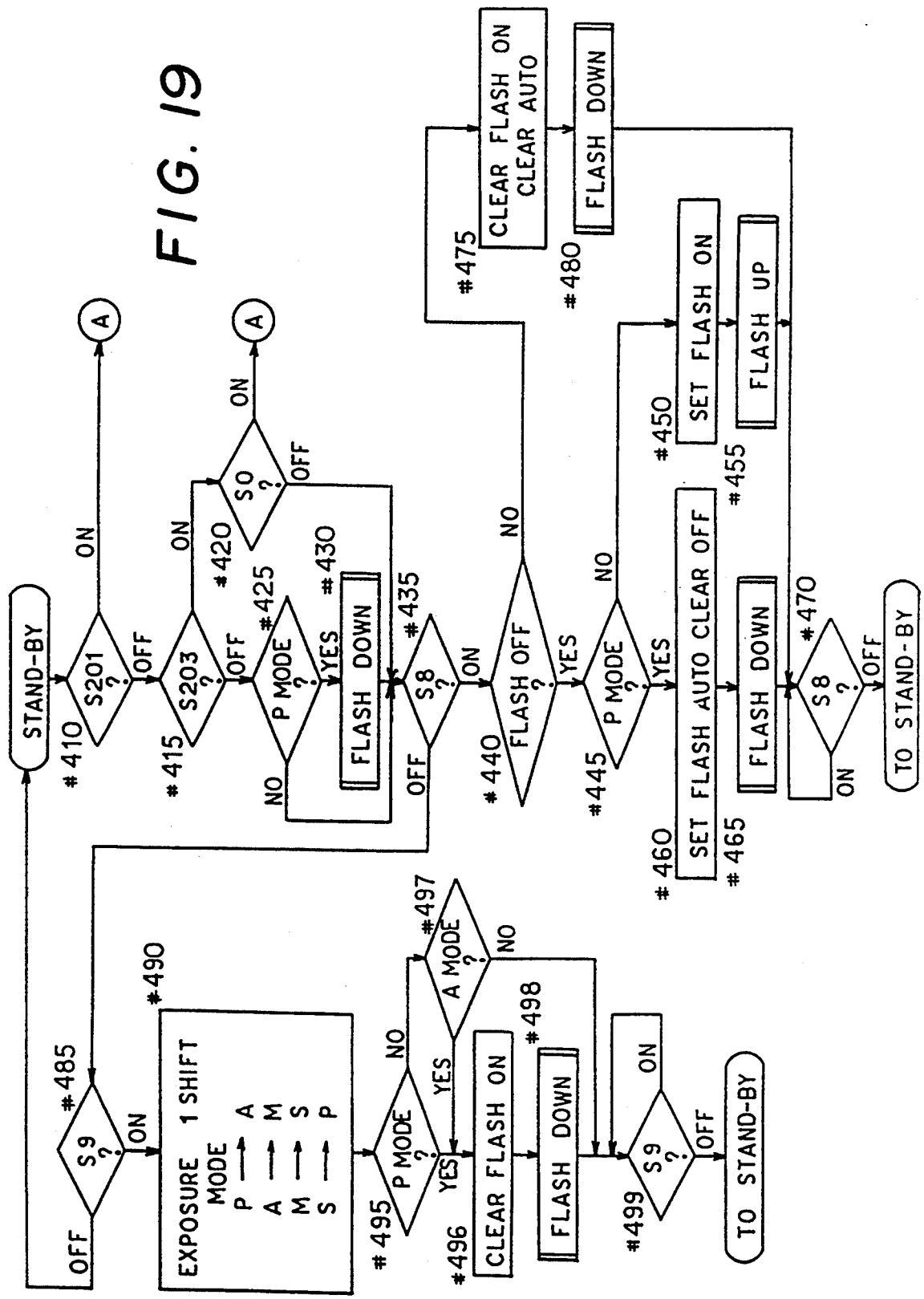
FIG. 19 is a flowchart showing an example of programs of a control microcomputer.
Figure 20:
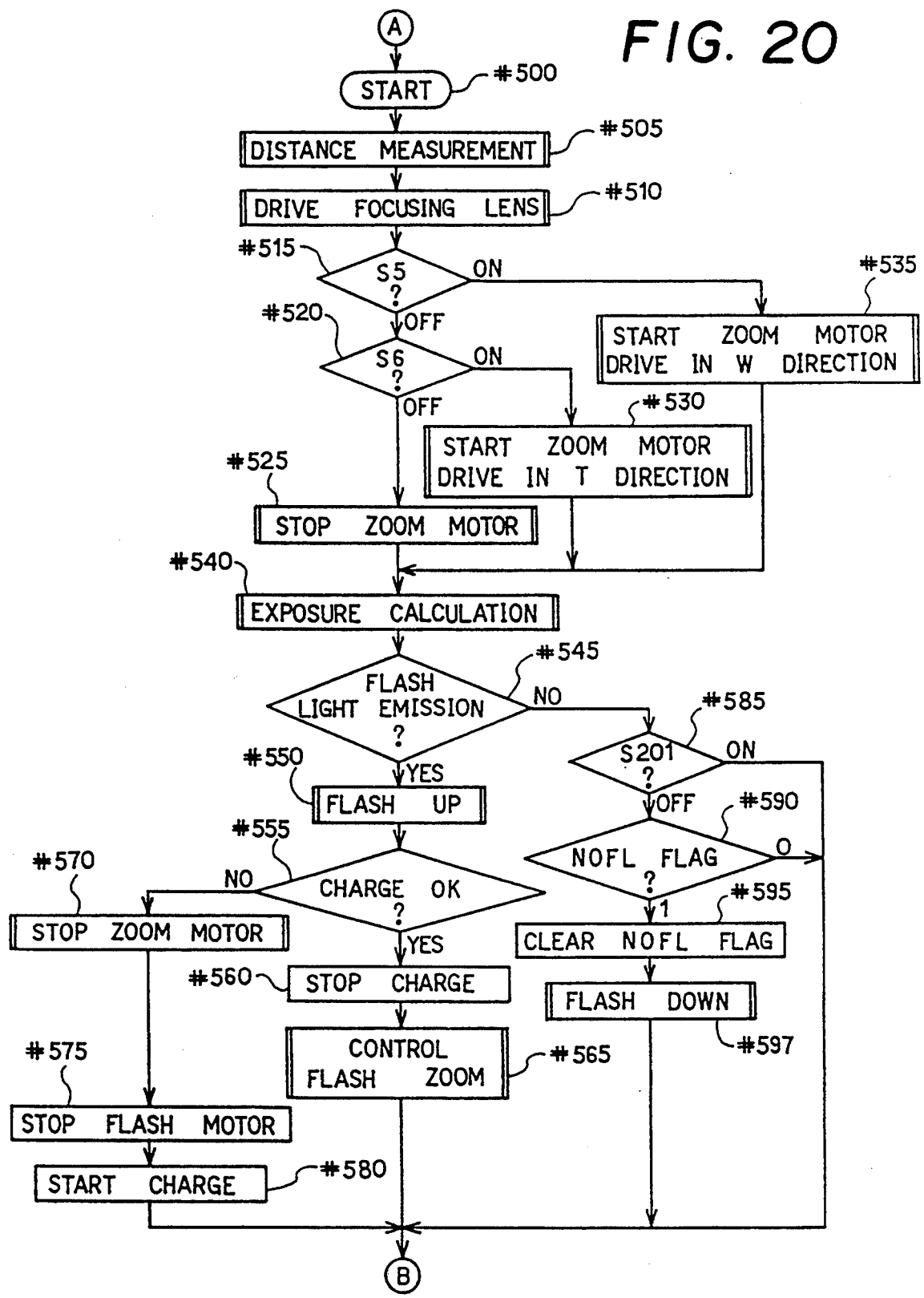
FIG. 20 is a flowchart thereof.
Figure 21:
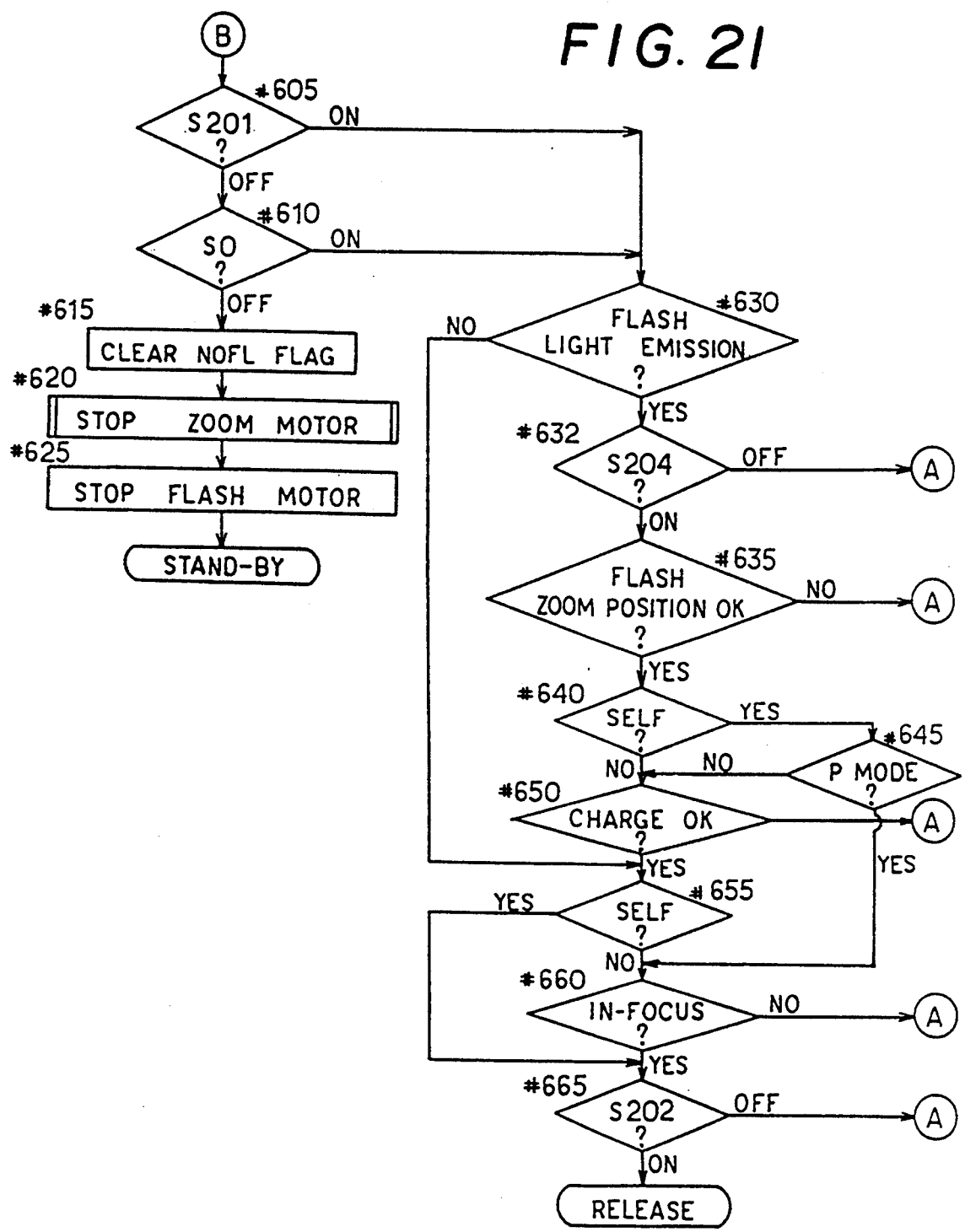
FIG. 21 is a flowchart thereof.

FIGS. 19, 20, and 21 are flowcharts showing an example of a program of the microcomputer 201 in FIG. 18. The operation of the program is explained in accordance with these flowcharts. It is checked whether the switch S201 is turned ON, which becomes operable by pressing halfway the release button at #410. In case the switch S201 is ON, procedure advances to #500 to start a preparatory operation for release. In case of OFF, whether a grip switch S203 is turned ON at #415 is checked. If the switch S203 is turned ON, the switch S0 is checked at #420 to detect whether an eye is approaching the view finder. In case that the view finder is approached and the switch S0 is turned ON, procedure advances to the start at #500.

Nextly, at #505 consequent to #500, an object distance is measured by means of the distance measuring circuit 209. At #510, a motor M2, which drives the lens for auto focus photographing, is driven in accordance with the measured distance, for focusing operation. Thereafter, detecting the zooming operation of the photographing lens at #515 and #520, the zoom lens is driven, which operation is carried out by driving the zoom motor M4 with use of the driving circuit 212. That is, if the switch S5 is turned ON at S515, the zoom motor M4 is started to be driven at #535 so that an angle of view becomes wider. If the switch S5 is OFF at #515, the switch S6 is checked at #520. In case of ON, the zoom motor M4 is started to be driven at #530 so that the focal length becomes longer. If switches S5 and S6 are both turned OFF, the drive of the zoom motor M4 is stopped at #525. Following which, procedure advances to #540, and calculation for exposure is performed to determine an appropriate exposure based on an object brightness data from the light measuring circuit 206.

Figure 22:
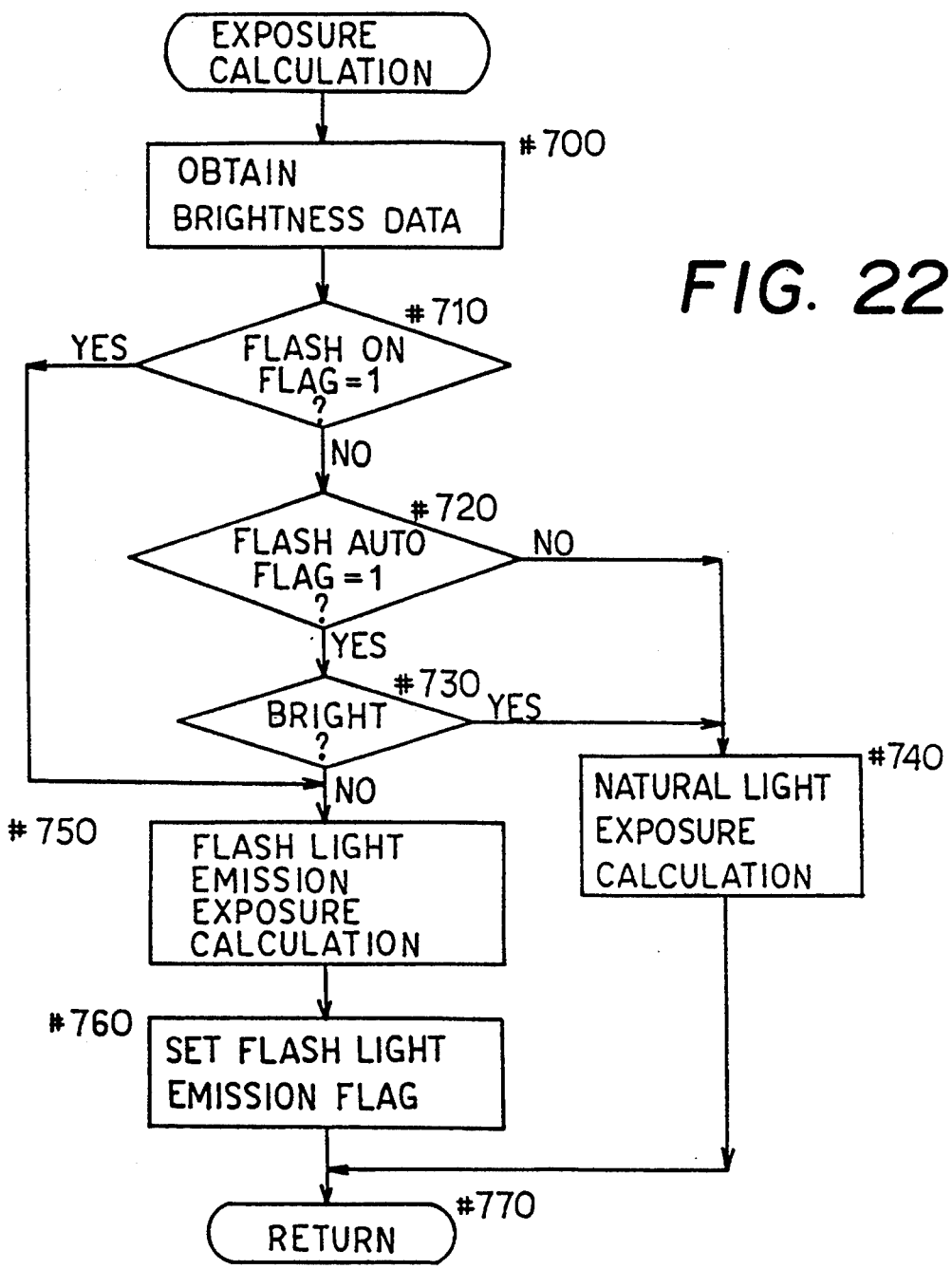
FIG. 22 is a flowchart showing a process of calculation for exposure.

The calculation for exposure is described in detail with reference to FIG. 22. Firstly, the object brightness data is obtained at #700 from the light measuring circuit 206, and thereafter a flash mode is checked from #710. As for a flash mode, a program mode (P mode hereinafter) is set as an exposure mode, either an AUTO mode permitting an automatic light emission or an OFF mode inhibiting a light emission is selected. When the mode other than P mode is set as an exposure mode, either an compulsory ON mode making the flash emit light or the OFF mode inhabiting a light emission is selected.

Procedure begins by checking at #710 whether or not a flash ON flag is 1. As will become apparent later, the flash ON flag is set when the compulsory ON mode is selected as a flash mode. When the flash ON flag is not 1, a flash AUTO flag is checked at #720. The flash AUTO flag, too, is set when AUTO is selected as a flash mode. In case of AUTO, it is checked at #730 whether the object brightness is brighter than the predetermined brightness. In case that it is darker, or that the compulsory ON mode is selected at #710, performed is the exposure for calculation with flash light emission at #750. Setting the flash light emission flag at #760, procedure returns at #770. When the flash AUTO flag is not 1, or in case that it is brighter than the predetermined brightness in the AUTO mode, the calculation for exposure with natural light is carried out at #740, and procedure returns at #770.

The explanation is given, returning to FIG. 20. As a result of the calculation for exposure at #540, it is judged whether or not flash photographing is at #545. In case of flash photographing, the light emission case is moved up at #550, and thereafter whether the charging of the flash is completed is checked at #555. If it is not completed, the zoom motor M4 and the flash motor M1 are stopped respectively at #570 and #575, to start charging at #580. If the charging is completed, it is stopped at #560, and the zooming control of the flash is carried out at #565. As for an example of the zooming control of the flash carried out at this step #565, it is given that light distributing angle of the flash is adjusted in accordance with the detected focal length of the photographing lens. Since such a zooming control of the flash is well known, it is not described here in detail.

In case of non flash photographing at #545, procedure branches to #585, checking whether the switch S201 is turned ON. In case of OFF, a NOFL flag is checked at #590. The NOFL flag is a flag which is set when non flash (stationary light) photographing has been carried out. Accordingly, if the NOFL flag is 1 in this point, it is because the switch S201 is turned OFF after the performance of non flash photographing. In such a case, the NOFL flag is cleared at #595, and the light emission case is moved down at #597. That is, when non flashing condition maintains after the performance of the non flash photographing and the switch S209 is turned OFF, the flash is popped down.

Procedure having been completed the above #580, #565, #597 and the like, the program flow advances to the #605 and its later steps in FIG. 21. At #605 and #610, whether either the switch S201 or the switch S0 is turned ON or not is checked. In case of ON, procedure branches to #630. If both of the switches are OFF, procedure advances to #615, clearing the NOFL flag, stopping the zoom motor M4 at #620 and the flash motor M1 at #625, returning to stand-by.

Procedure of #630–#665 is a routine for judging whether the photographing is to permitted or not. If either the switch S201 or the switch S0 is turned ON, procedure advances to #630, to check whether flash photographing or not, based on the result of exposure calculation. In case of flash photographing, it is checked at #632 whether the flash light emission case is moved up by means of the switch S204. If moved up, it is checked at #635 whether the zoom position of the flash is adjusted to that of the lens. This check is executed by an encoder (not illustrated) and the like which is arranged to detect a zoom position of the flash and other instruments. If adjusted, whether or not the self photographing mode is set is checked at #640. In case the self photographing mode is not set, whether the charging is completed is checked at #650. In case of the self photographing mode at #640, procedure branches to #645 to check whether P mode is set as an exposure mode. If P mode is not set, procedure branches to #650. If P mode is set, it branches to #630. That is, when both self mode and P mode are set for flash photographing, the photographing operation is permitted to start, even if the charging is not completed.

It is checked at #655 whether self photographing mode is set. In case of self mode, an in-focus judgment at #660 is skipped. Lastly, whether the switch S202 is turned ON at #665 is checked. In case of ON, procedure advances to a release routine. If all of the conditions for photographing are not met at #630–#665, procedure returns to the start (#500), waiting for the photographing conditions to be met, while switch S201 or S0 is turned ON. Meanwhile, the motor M2 for auto focus photographing, the lens zooming motor M4, and the flash mechanism driving motor M1 are driven simultaneously, if needed.

Figure 23:
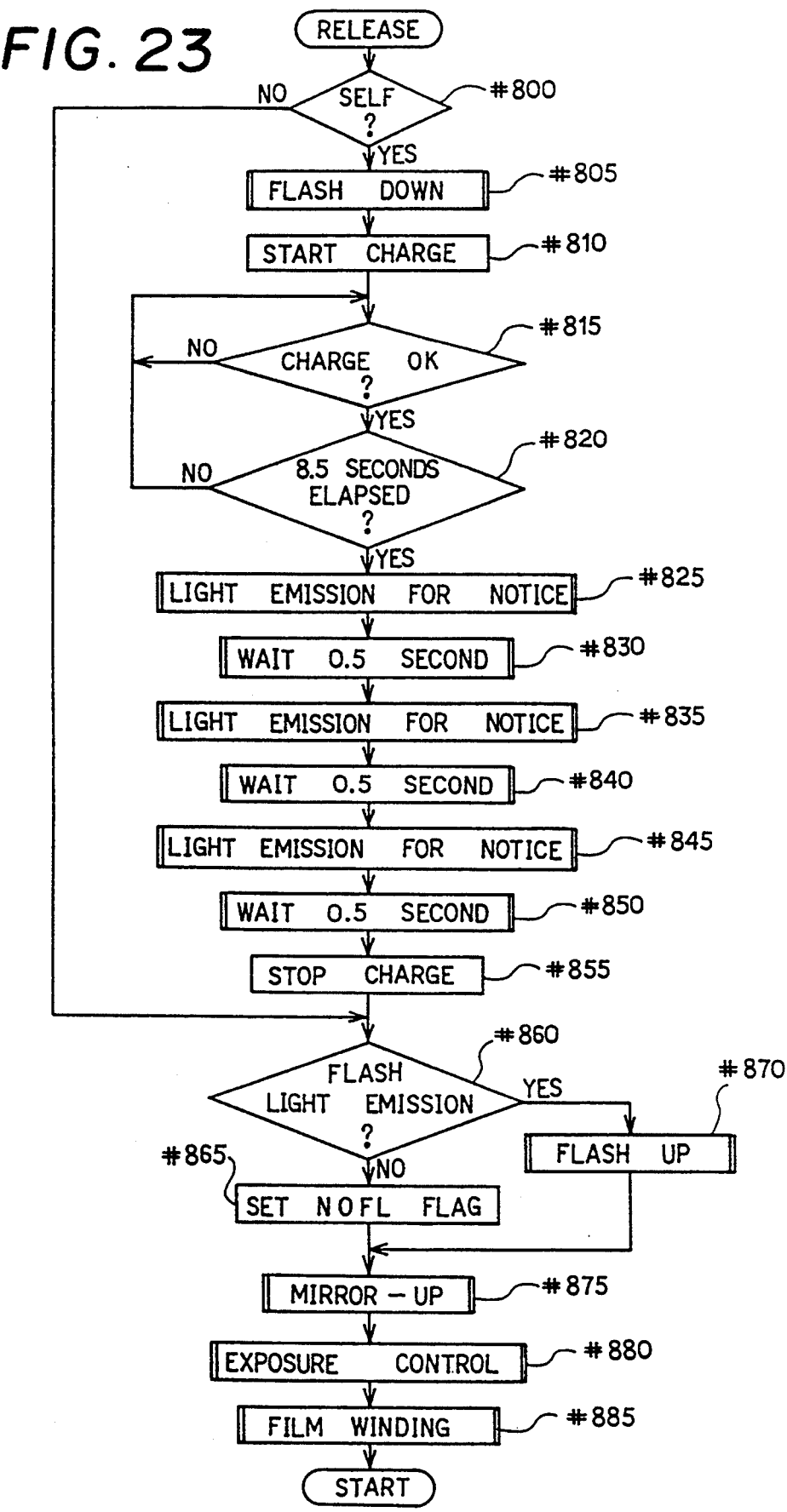
FIG. 23 is a flowchart showing a process of release operation.

FIG. 23 shows the release routine. Firstly, whether self photographing is or not is checked at #800. In case of self photographing, procedure proceeds to #805 to pop down the flash, if it has been popped up. This is performed to cause the flash to emit light through the opaque slit explained in FIG. 17, for notifying the photographing timing of a self release to a man to be photographed. Nextly, the charging of the flash is started at #810, and then charge completion is checked at #815. Having waited for the self-timer to start (for 8.5 seconds here), after the elapse of the time, flash light is emitted three times with 0.5 second interval. This light emission is carried out in smaller guide number than actual photographing. During this operation, in order to prevent the decline of charging voltage which is caused by the light emission for notice, charging is continued during the light emission for notice. After the completion of the light emission, the charging is stopped at #855. If not self photographing, the steps #805–#855 are skipped.

Nextly, whether flash photographing is or not is checked at #860, and the flash is popped up again at #870 in case of flash photographing. In case of not flash photographing, the NOFL flag is set at #865, and thereafter mirror-up and exposure operation are carried out at #875 and #885. The photographing operation is completed after winding film at #885, and procedure returns to the start again for next photographing.

Returning to FIG. 19, the case when the switch S201 and S203 are both turned OFF at #410 and #415 is explained. If P mode is set as an exposure mode at #425, the flash is popped down at #430. That is, the flash is popped down, when the switch S0 or S201 is turned ON, the automatic light emission is determined at #540, and the flash is popped up at #550, if thereafter the switch S201 and S0 both become OFF, and further the switch S203 becomes off, namely the grip is not hold. Consequently, the flash mode selecting switch S8 is checked. In case of ON, whether the current flash mode is turned OFF is checked at #440, and in case of OFF, whether it is P mode is checked at #445. In case of P mode, the flash AUTO flag is set at #460, the OFF flag being cleared. The flash is thus set into the automatic light emission mode. The flash is popped down at #465.

When it is not P mode at #445, the flash ON flag is set at #450. The flash is thus set into the compulsory light emission mode, and popped up at #455. When the current flash mode is AUTO or ON at #440, the flash AUTO/ON flag is cleared at #475. The flash mode becomes OFF thereby, and the flash is popped down at #480. Having set the flash mode as described above, waiting the switch S8 to be turned OFF at #470, procedure returns to the stand-by.

In case the switch S8 is OFF at #435, the exposure mode setting switch S9 is checked from #485. In case of ON, the exposure mode is changed at #490. At this point, prepared exposure modes are as follows; a program mode (P mode) wherein the combination of shutter speed with aperture is set up automatically, an aperture priority mode (A mode), a manual mode (M mode) wherein the photographer himself sets up shutter speed and aperture and a shutter speed priority mode (S mode). The mode change is carried out in the manner that from P mode to A mode, from A mode to M mode, from M mode to S mode, from S mode to P mode. After that, it is checked whether or not P mode is set as a result of the mode change at #495. In such a case, the flash ON flag is cleared at #496, and the flash is popped down at #498. In case of not P mode, whether A mode is checked at #497. In case of A mode, the flash ON flag is cleared at #496, and the flash is popped down at #499.

In this way, when exposure mode is changed from the mode other than P into P mode, the flash mode remains OFF if OFF before setting, changes to AUTO if ON. Also, when changed from P mode to other modes, the flash mode becomes OFF irrespective of the mode before setting. In case exposure mode has been changed among the modes other than P, the flash mode is maintained, and up/down movement does not take place. Then, procedure returns to the stand-by when the switch S9 is turned OFF at #499.

Figure 24:
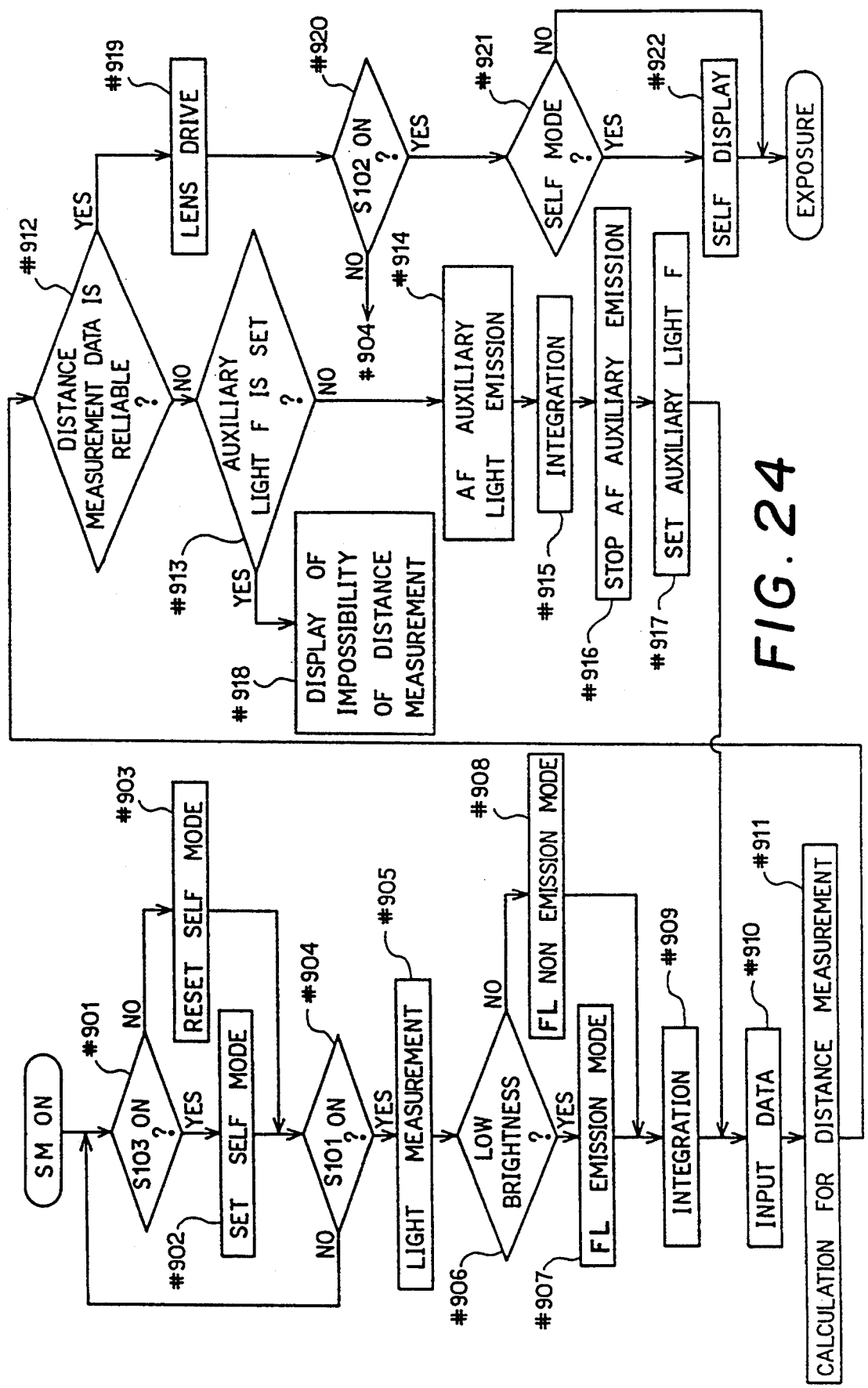
FIG. 24 is a flowchart showing an operation of a camera according to the forth embodiment of the present invention.

The foregoing first, second and third embodiments include an example wherein a built-in flash is used for AF auxiliary light and an example wherein a built-in flash is used for self-timer indication. Now explained as a forth embodiment is an example wherein a built-in flash is used for AF auxiliary light as well as for self-timer indication. FIG. 24 is a flowchart showing an operation of a camera according to the forth embodiment. Its circuit diagram is the same as FIG. 8. The operation of an external flash is omitted in the firth embodiment.

After a main switch SM is turned ON, whether a self switch S103 is ON is checked (#901). In case of ON, self mode is set. In case it is not ON, self mode is reset (#902, #903). After that, waiting for a switch S101 to be ON. When the switch S101 is turned ON, light is measured, it is judged whether or not low brightness is, base on the light measurement data (#904–#906). In case of low brightness, flash light emission mode is set. In case of no low brightness, flash light non emission mode is set (#907, #908).

Thereafter, the integration of CCD for distance measurement is executed, and integration data is input, and the calculation for distance measurement is executed (#909–#911). Based upon the result of this calculation, whether or not the distance measurement data is reliable or not is judged (#912). The lack of reliability in the distance measurement data is because of low brightness of an object, low contrast and the like.

When the distance measurement data is reliable, a lens is driven based on the data (#919), waiting for the switch S102 to be turned ON. When reliability lacks, nextly checked is whether an AF auxiliary light has been emitted already by the built-in flash (#913). If it has not been emitted, the AF auxiliary light is emitted by the built-in flash (#914), and the integration of CCD is performed during the light emission (#915). After the integration, the auxiliary light is stopped, and the flag which shows that the AF auxiliary light has already been emitted is set (#916, #917). In case it is discriminated at #913 that the AF auxiliary light has been emitted already, the impossibility of distance measurement is displayed (#918).

When the switch S102 is turned ON at #920, whether self mode or not is judged (#921). In case of self mode, the elapse of a predetermined time is waited, during which indication of self-timer is carried out by making the flash light emit at plural times (#922). If it is not self mode, the exposure operation is started without indication of self-timer. Since this exposure operation is the same as the operation shown in FIG. 15, it is not described here.

The preferred embodiments described herein are illustrative and not restrictive, the scope of the invention being indicated by the appended claims and all variations which come within the meaning of the claims are intended to be embraced therein.

What is claimed is:

1. A camera comprising:
   focus detecting means for performing a focus detection;
   a flash light tube for illuminating an object to emit flash light both during the focus detecting operation and an exposure operation;
   first control means for activating the flash light tube intermittently to emit flash light when an additional illumination is needed for the focus detecting operation; and
   second control means for activating the flash light tube to emit flash light when an additional illumination is needed for the exposure operation.

2. A camera as claimed in claim 1 further comprising:
   judging means for judging during the focus detection whether or not light emission by the flash light means is necessary;
   charging means for charging electric charge used for the flash light emission; and third control means for controlling so that the charging means starts charging when it is judged that the flash light emission is necessary by said judging means.

3. A camera as claimed in claim 1, wherein the flash light means is incorporated in a camera body and is inhibited from emitting light when illuminating means for emitting light upon an object so as to assist a focus detecting, provided separately from the camera body, is mounted on the camera body.

4. A camera comprising:
   focus detecting means for performing a focus detection;
   auxiliary means for illuminating an object to emit light during focus detection so as to assist a focus detecting operation;
   charging means for charging an electric charge so that the auxiliary means emit light;
   judging means for judging during the focus detection whether or not light emission of the auxiliary means is necessary; and
   control means for controlling so that the charging means starts charging when it is necessary by said judging means.

5. A camera as claimed in claim 4 wherein light emission of the auxiliary means is carried out intermittently.

6. A camera as claimed in claim 5 wherein the control means controls so that charging is carried out within intervals between the intermittent light emissions.

7. A camera system comprising:
   focus detecting means for performing a focus detection;
   first flash light means incorporated in a camera body for illuminating an object to emit light during exposure operation;
   first auxiliary means incorporated in the camera body for illuminating an object to emit light during focus detection so as to assist a focus detecting operation;
   second flash light means provided separately from a camera body for illuminating an object to emit light during exposure operation;

second auxiliary means provided separately from a camera body for illuminating an object to emit light during focus detection so as to assist a focus detecting operation; and control means for inhibiting light emission of the first flash light means or the first auxiliary means when the second flashlight means or the second auxiliary means is mounted on the camera body.

8. A camera comprising:

a release member;

outputting means for outputting a signal in response to an operation of the release member;

means for carrying out a release operation in response to the output of the release signal;

self-timer means operating in a self-timer mode, for delaying a start of the actual release operation for a predetermined time after the release signal is output;

a flash light tube for illuminating an object to emit flash light both during the delayed time by the self-timer means and an exposure operation;

first control means for activating the flash light tube to emit light during the delayed time in order to display that the self-timer means is operating; and second control means for activating the flash light tube to emit light when an additional illumination is needed for the exposure operation.

9. A camera as claimed in claim 8 further comprising:

a pop-up mechanism provided on a camera body, and wherein the flash light means is provided on the pop-up mechanism, and the first control means activates the flash light means to emit light during said delayed time by said delaying means with the pop-up mechanism popped down.

10. A camera as claimed in claim 9 further comprising:

a filter for passing emitted light when the flash light means emits light with the pop-up mechanism popped down.

11. A camera as claimed in claim 8 further comprising;

a filter for passing emitted light of said flash light means, and wherein during the delayed time by the delaying means the flash light means is activated to emit light through the filter.

12. A camera as claimed in claim 8, wherein the flash light means is incorporated in a camera body, and is inhibited from emitting light during a delayed time when display means for displaying the delayed time, provided separately from a camera body, is mounted on the camera body.

13. A camera system comprising:

outputting means for outputting a signal to start a release operation;

delaying means for delaying a start of actual release operation for a predetermined time after the starting signal is output;

flash light means incorporated in a camera body for illuminating an object;

first control means for activating the flash light means to emit light during the delayed time by the delaying means;

second control means for activating the flash light means to emit light during an exposure operation;

display means provided separately from a camera body for displaying that the release operation is being delayed by the delaying means; and inhibiting means for inhibiting light emission of the flash light means during the delayed time when the display means is mounted on the camera body.

14. A camera comprising:

a release member;

outputting means for outputting a release signal in response to an operation of the release member;

means for carrying out a release operation in response to the output of the release signal;

self-timer means, operating in a self-timer mode, for delaying a start of the release operation for a predetermined time after the release signal is output;

light measuring means for measuring an object brightness;

pop-up mechanism provided on a camera body;

flash light tube provided on the pop-up mechanism for illuminating an object during an exposure operation;

display means provided on the pop-up mechanism for displaying that the release operation is being delayed by the self-timer means;

judging means for judging whether or not light emission of the flash light tube is necessary based on a light measurement result of the light measuring means; and control means for popping up the pop-up mechanism when the judging means judges that light emission of the flash light tube is necessary, and for activating the display means when delay of time is performed by the self-timer means.

15. A camera as claimed in claim 14 wherein the display means displays that the release operation is being delayed with the pop-up mechanism popped up when the flash light tube provided on the pop-up mechanism is popped up.

16. A camera as claimed in claim 14 wherein the display means displays that the release operation is being delayed with the pop-up mechanism popped down when the flash light tube provided on the pop-up mechanism is popped down.

17. A camera comprising:

outputting means for outputting a signal to start a release operation;

delaying means for delaying a start of actual release operation for a predetermined time after the starting signal is output;

pop-up mechanism provided on a camera body;

display means provided on the pop-up mechanism for displaying that the release operation is being delayed by the delaying means;

mode setting means for setting two modes selectively, first mode to start release operation immediately after the starting signal is output and second mode to start release operation after the elapse of a predetermined time by the delaying means; and control means for popping up the pop-up mechanism when the second mode is set by the setting means and for activating the display means when delay of time is performed by the delaying means.

18. A camera as claimed in claim 17 wherein the display means is a flash for illuminating an object and emits a light during exposure operation in accordance with an object brightness.

19. A camera comprising:

focus detecting means for performing a focus detection;

a release member;

outputting means for outputting a release signal in response to an operation of the release member;

means for carrying out a release operation in response to the output of the release signal;

self-timer means, operating in a self-timer mode, for delaying a start of the release operation for a predetermined time after the release signal is output when a self-timer mode is selected;

a flash light tube for illuminating an object to emit flash light during the focus detecting operation, the delayed time by the self-timer means and an exposure operation;

first control means for activating the flash light tube to emit light when an additional illumination is needed for the focus detecting operation;

second control means for activating the flash light tube to emit light during the delayed time in order to display that the self-timer means is operating; and third control means for activating the flash light tube to emit light when an additional illumination is needed for the exposure operation.

* * * * *